Jan. 10, 1933.   P. P. LA MONTAGNE   1,893,589
KNITTING MACHINE
Filed Feb. 18, 1930    14 Sheets-Sheet 1

Inventor.
Patrick P. LaMontagne
by Heard Smith & Tennant
Attys.

Jan. 10, 1933.  P. P. LA MONTAGNE  1,893,589
KNITTING MACHINE
Filed Feb. 18, 1930  14 Sheets-Sheet 3

Inventor.
Patrick P. La Montagne
by Heard Smith & Tennant.
Attys.

Jan. 10, 1933.   P. P. LA MONTAGNE   1,893,589
KNITTING MACHINE
Filed Feb. 18, 1930   14 Sheets-Sheet 7

Inventor.
Patrick P. LaMontagne
by Heard Smith & Tennant.
Attys.

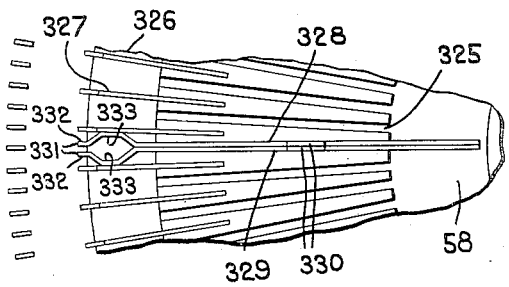
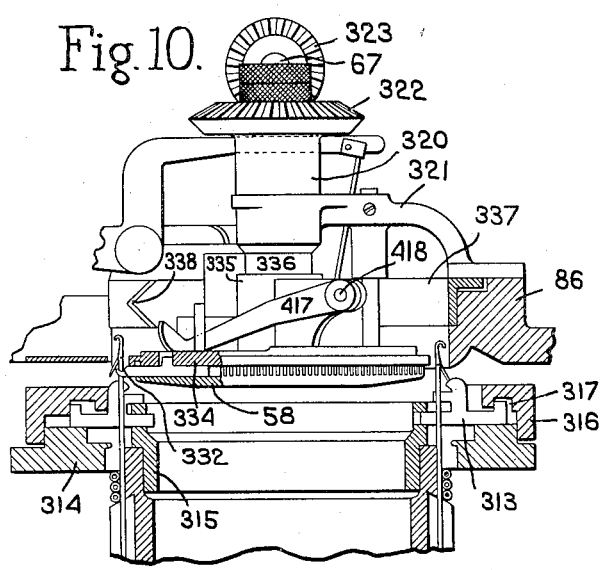

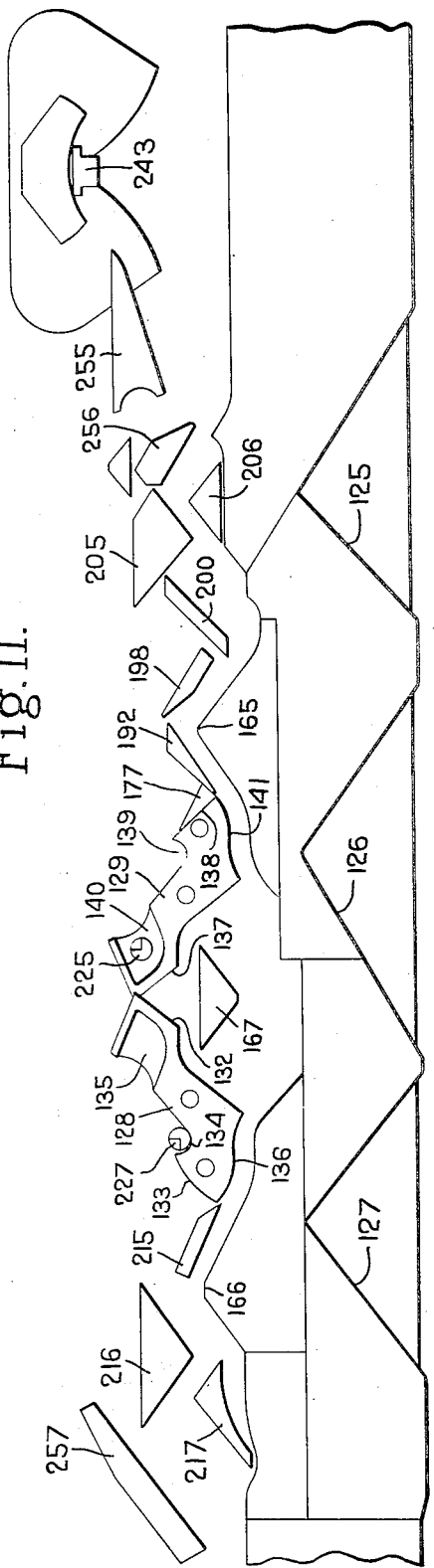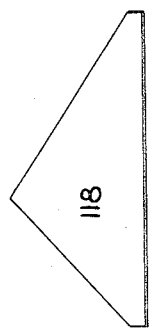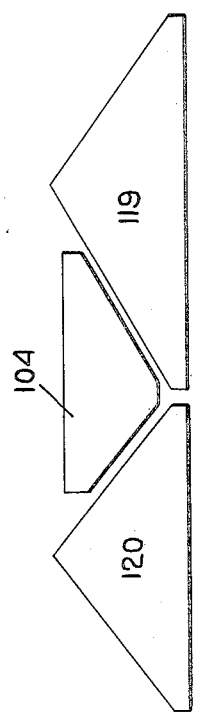

Jan. 10, 1933.  P. P. LA MONTAGNE  1,893,589
KNITTING MACHINE
Filed Feb. 18, 1930  14 Sheets-Sheet 10

Inventor.
Patrick P. LaMontagne
by Heard Smith & Tennant
Attys.

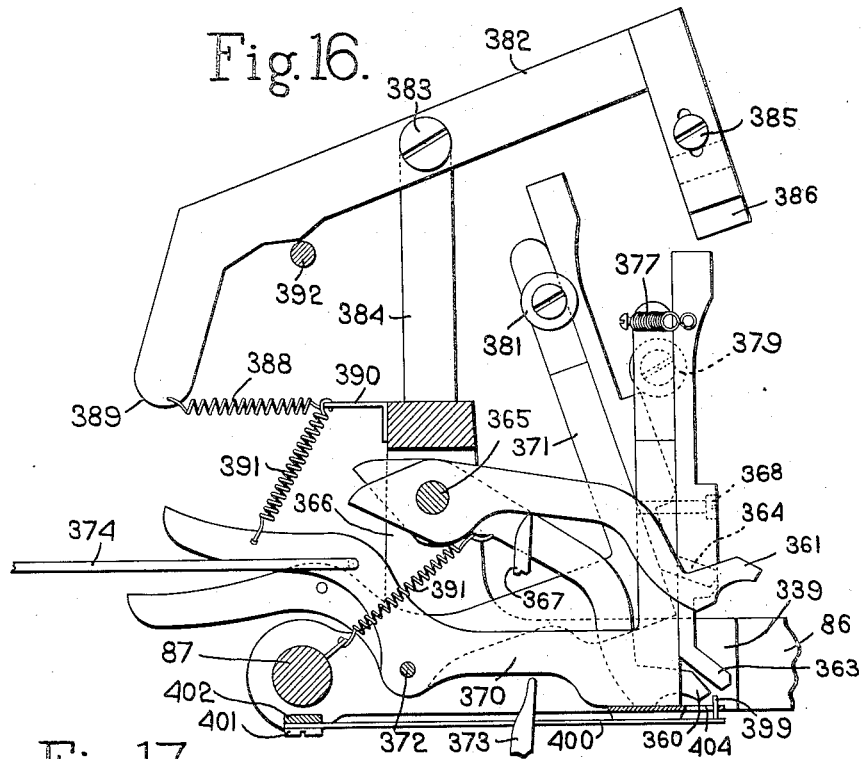

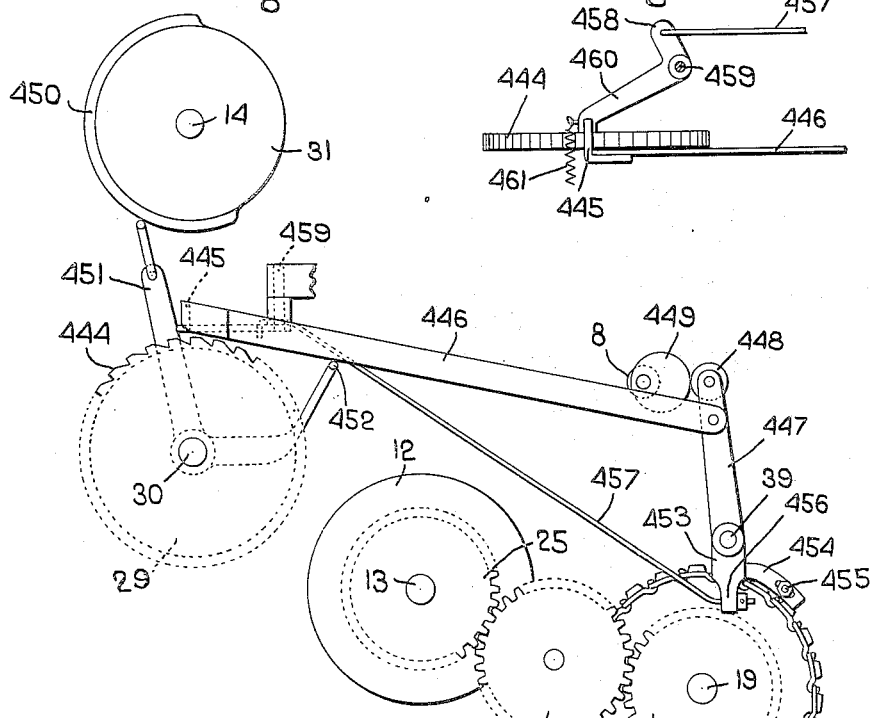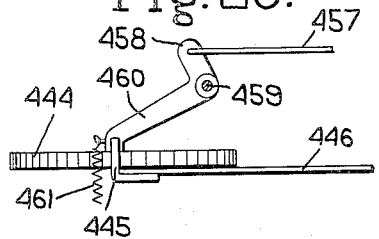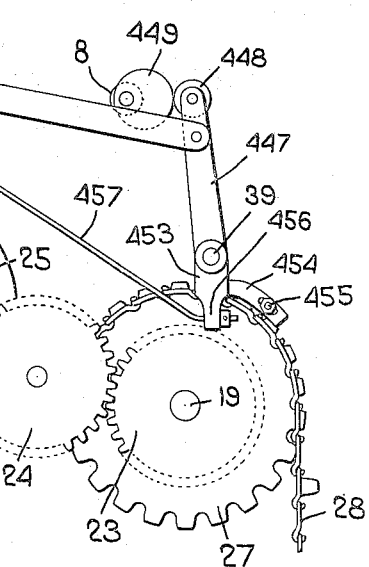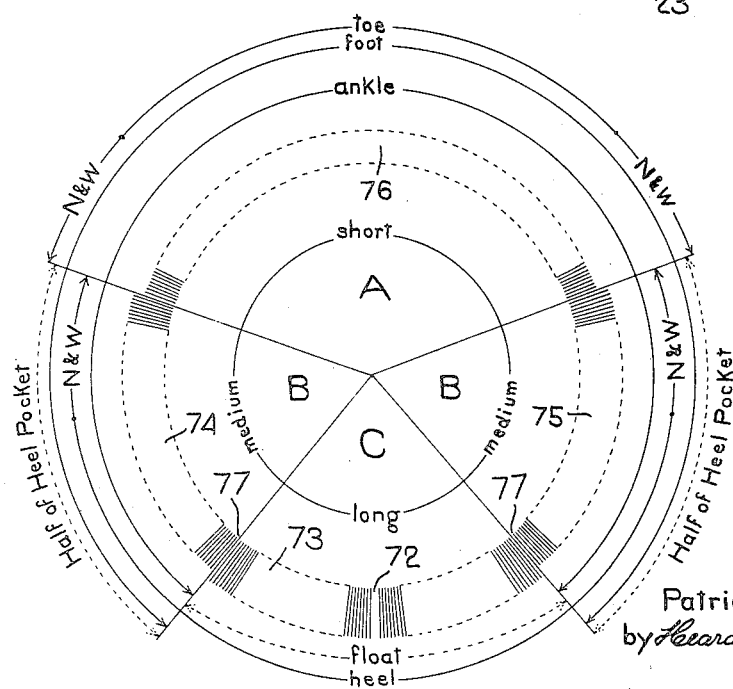

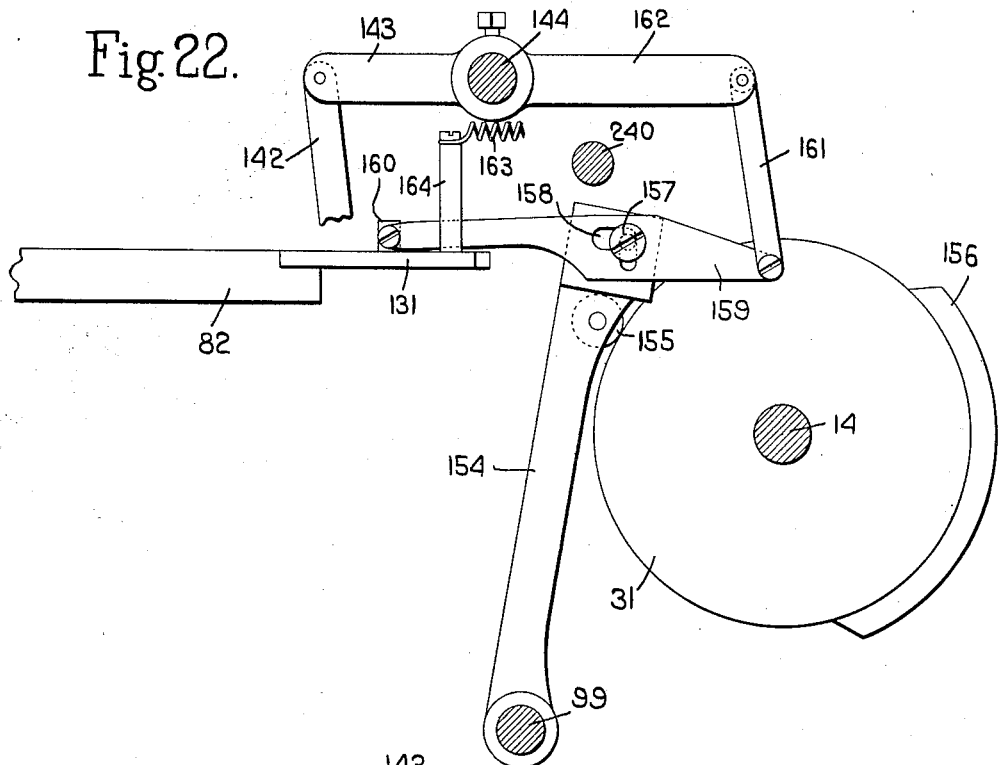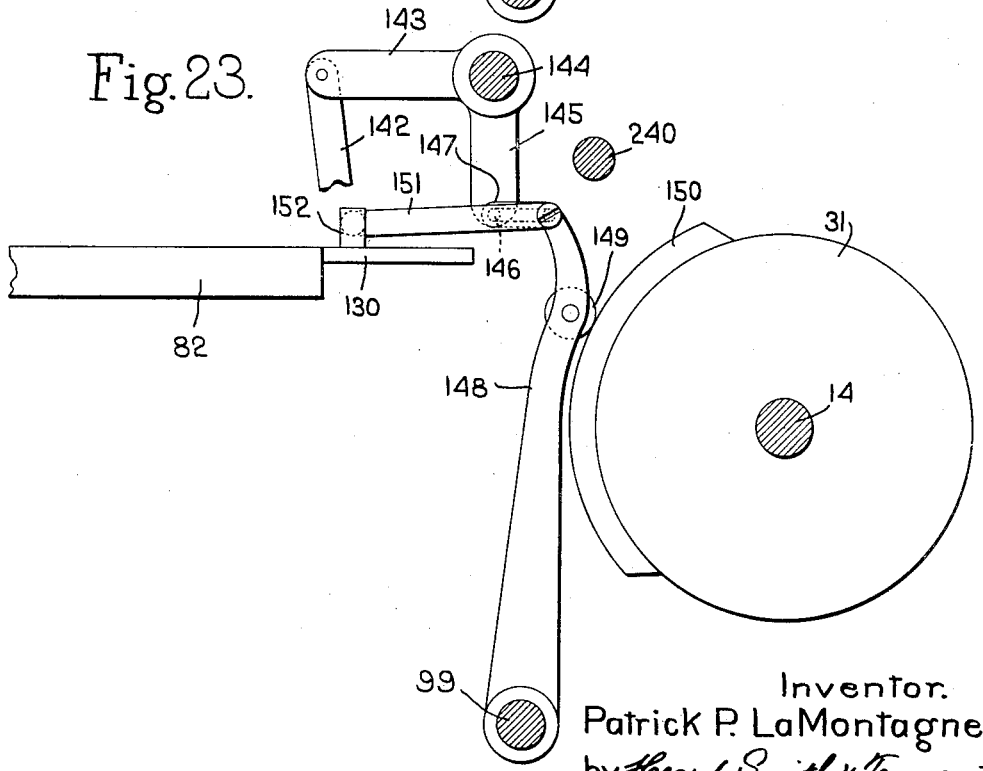

Jan. 10, 1933.   P. P. LA MONTAGNE   1,893,589
KNITTING MACHINE
Filed Feb. 18, 1930   14 Sheets-Sheet 14

Inventor.
Patrick P. La Montagne
by Heard Smith & Tennant
Attys.

Patented Jan. 10, 1933

1,893,589

UNITED STATES PATENT OFFICE

PATRICK P. LA MONTAGNE, OF KANKAKEE, ILLINOIS, ASSIGNOR TO LA MONTAGNE MACHINE COMPANY, OF KANKAKEE, ILLINOIS, A CORPORATION OF ILLINOIS

KNITTING MACHINE

Application filed February 18, 1930. Serial No. 429,425.

This invention relates to a knitting machine primarily of the type in which the needles are reciprocated in a needle cylinder and in which the needle cylinder and the cam cylinder for operating the needles are relatively rotated and oscillated to enable either round and round or to and fro work to be performed. In the preferred form of the invention, the needle cylinder is rotated and oscillated with respect to the fixed cam cylinder. While the machine of the invention is of broad application, it is more particularly designed for producing a complete stocking web preferably knit from the top to the toe.

More particularly the invention has for its object to provide a machine for producing a stocking web such as disclosed in my application No. 372,017, filed June 19, 1929.

The invention has for its further object to produce the main portion of the stocking web by reciprocating or to and fro knitting thus enabling the web to be shaped properly to fit the leg and foot of the wearer without materially distorting the web and with the minimum wastage of yarn.

The invention has for its further object to provide a machine for knitting such a web in which the edges of the web are selvaged.

The invention has for its further object to provide such a machine in which the toe pocket is formed at the front of the web, thus doing away with seams across the top of the toes.

The invention has for its further object to provide a machine in which spliced areas are formed in the web in the lower portion of the ankle section to present high spliced heel effects of varying configuration and either single or double.

The invention has for its further object to provide such a machine in which the foot portion is knit with spliced areas extending from each edge of the web and presenting, if desired, edges in the body of the web of varying configuration.

The invention has for its further object to provide such a machine in which the length of stitch is under control at all times and may be varied as required during the knitting of the splaced areas and in accordance with the varying width of said areas.

These and many other objects and features of the invention will appear more fully from the accompanying description and drawings and will be particularly pointed out in the claims.

As many features of the construction and operation of the general type of knitting machine in which the preferred form of the invention is herein shown as embodied are well known and familiar to those skilled in the art, it is unnecessary here to illustrate and describe all the various details of a knitting machine vith which the present invention is not particularly concerned. Reference may be made to the disclosures in my Patent No. 1,695,734, December 18, 1928, and to other patents hereinafter referred to.

In the drawings:

Fig. 9 is a fragmentary plan view showing the dial bed and transfer elements.

Fig. 10 is a side elevation and partial vertical cross section showing the upper end of the needle cylinder, dial, and other associated elements.

Fig. 11 is a development of the cams, pickers, droppers, etc., for controlling the needles, pattern jacks, and restoring jacks.

Fig. 16 is a view chiefly in side elevation showing the yarn guiding fingers and certain operating means therefor.

Fig. 17 is a front elevation of the main portion of the construction shown in Fig. 16.

Fig. 18 is a bottom plan view of a portion of the construction shown in Fig. 16 to show the mechanism for directing the yarn into feeding position.

Fig. 19 is a view in side elevation showing the connections for intermittently driving the drum 29 from the main shaft under the control of the pattern drum and of a cam on the drum 31.

Fig. 20 is a top plan view of a portion of the construction shown in Fig. 19.

Fig. 21 is a diagrammatic view of a circular series of needles illustrating the preferred arrangement of the series of different length butt needles.

Figs. 22 and 23 are detail views in side elevation of the mechanism for moving the stitch cams both for round and round and for to and fro knitting.

Figure 1:
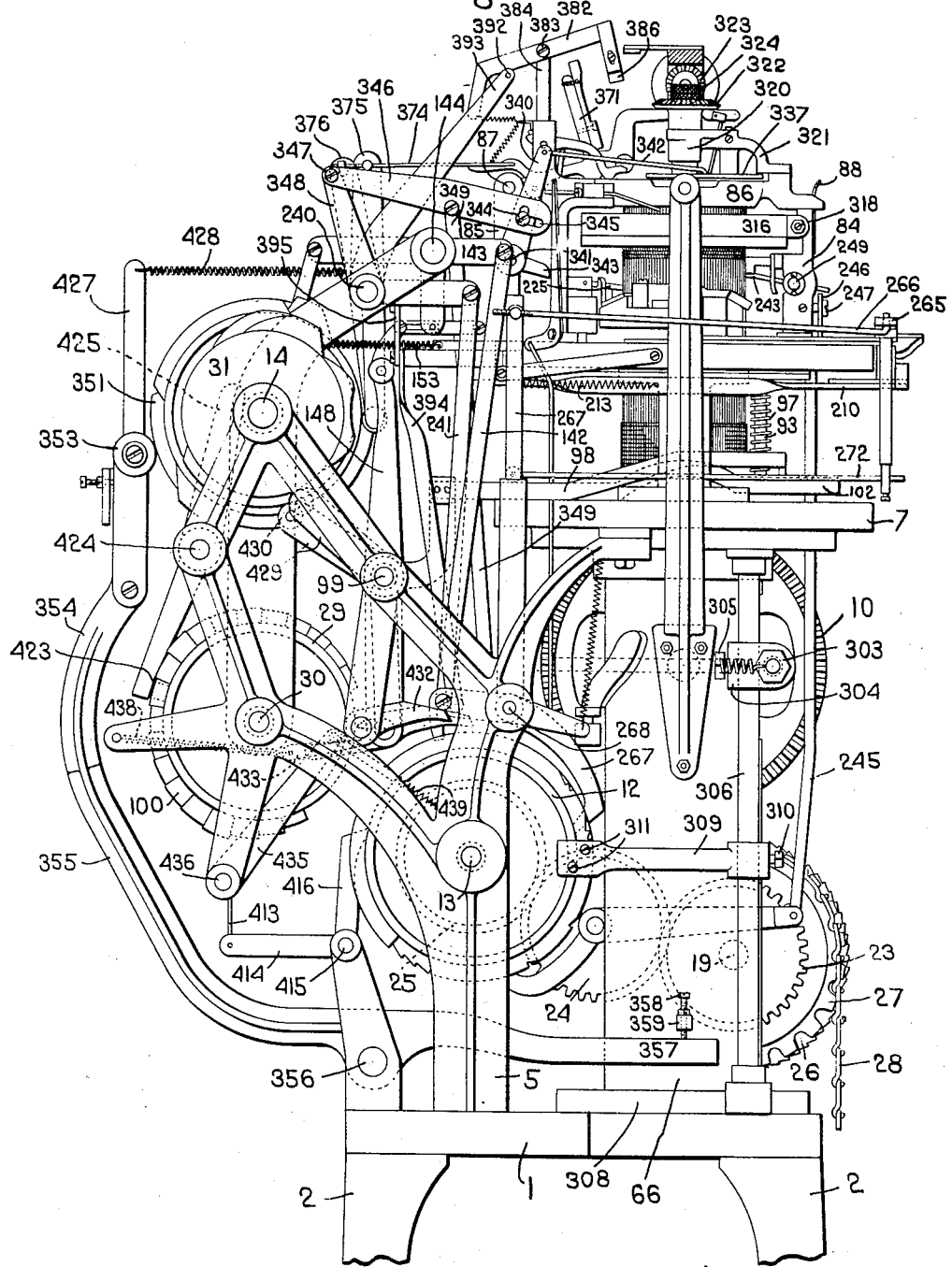
Fig. 1 is a side elevation looking toward the left of the machine.
Figure 2:
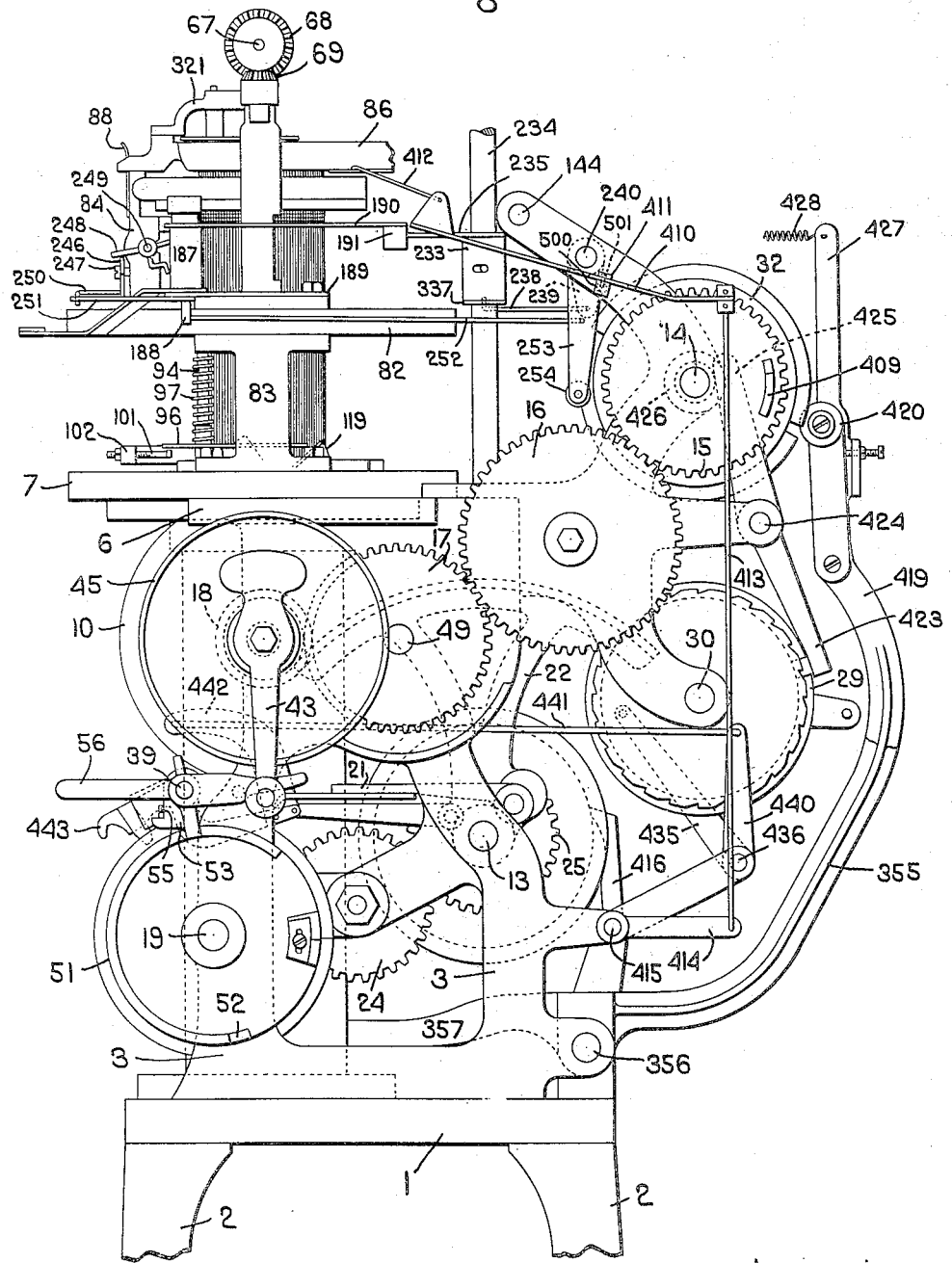
Fig. 2 is a side elevation looking toward the right of the machine.

The frame of the machine is shown as comprising the stand 1 supported from the floor by suitable legs 2. From this stand extends upwardly at the right the skeleton supporting side frame 3, the intermediate frame 4, and at the left the skeleton supporting side frame 5. The frames 3 and 4 support the table 6 and from this table extends laterally toward the left the bed plate 7 in which is mounted the cam cylinder.

Figure 28:
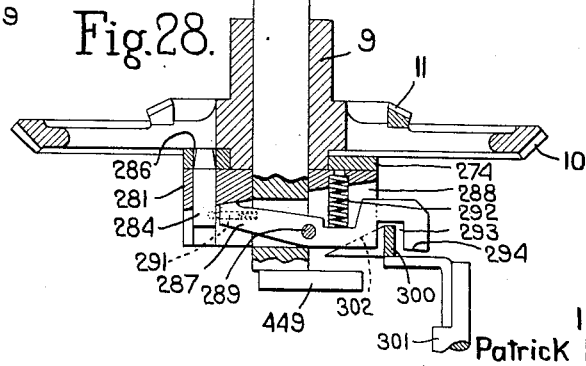
Fig. 28 is a transverse cross section of the construction shown in Fig. 24.

The main driving elements from which movement is imparted to the various instrumentalities concerned with the knitting operation and from which the various mechanisms are automatically controlled are, first, the main shaft 8 journalled in the frames 3 and 4. Second, the hub 9, see Fig. 28, carrying the bevelled gears 10 and 11 for revolving and reciprocating the needles according as round and round or to and fro knitting is required. Third, the pattern drum 12 with its shaft 13 journalled in the side frames which automatically controls various operations and elements to be described and which is driven by either of two separate mechanisms as required. Fourth, the drum shaft 14 journalled in the side frames and driven by the train of intermediate gears 15, 16, 17 from the pinion 18 on the main shaft 8. Fifth, the shaft 19 journalled in the frames 3 and 4 and driven by the rack wheel 20 secured thereto from the pawl 21 operated by the sector gear 22 as in the aforesaid patents. This shaft 19 also at times drives the pattern drum shaft 13 by means of the train of gears including the gear 23 on the shaft 19, the intermediate gear 24 journalled in the side frame 3, and the gear 25 on the shaft 13. Sixth, the ratchet wheel 26 and attached sprocket wheel 27 loose on the shaft 19 and carrying the pattern chain 28 operated and controlled as in my aforesaid Patent No. 1,695,734. Seventh, the drum 29 with its shaft 30 journalled in the side frames and driven from the main shaft under the control of both the pattern chain 28 and a drum 31 on the shaft 14. Eighth, the sliding drum 32 keyed to the shaft 14 and shifted thereon by the drum 29.

While the hub 9 with its gears 10 and 11 is rotarily shiftable on the main shaft 8, as hereinafter set forth, it is clutched to the shaft during the operation of the machine. The mechanism for rotating the main shaft 8 at different speeds and for oscillating the shaft when to and fro or reciprocating knitting is required may be, and is shown as, of the same construction as in my aforesaid patent. A clutch collar 33 is splined to the shaft 8 and is provided with tenons 34 adapted to engage depressions in the hub of the gear 35 and with tenons 36 adapted to engage depressions in the hub of the pinion 37. This collar 33 is shifted laterally by the slide 38 mounted on the rod 39 under the control of the cam 40 on the cam shaft 19. The pinion 37 is fast on a sleeve forming a journalled bearing for the shaft 8 and in turn journalled in a bushing 41 mounted on the side frame 3. This sleeve has fast thereto the pulley 42. A hand crank 43 is secured to the hub 44 of the pulley 42 and a loose pulley 45 is journalled on this hub. When, therefore, the clutch collar 33 is engaged with the pinion 37 and the driving belt is on the pulley 42, the bevelled gears 10 and 11 will be driven directly. A sleeve 46 is journalled on the bushing 41 and carries the pinion 18 and the pulley 47. The pinion 18 is connected by a gear train including the gears 17 and 48 on the shaft 49 to the pinion 37. Consequently with the driving belt on the pulley 47 and the clutch collar 33 in engagement with the pinion 37, the speed of the drive will be determined by the gear train. The gear 35 is loosely mounted on the shaft 8 and meshes with the sector gear 22 which in turn is oscillated from one of the gears on the shaft 49 at a speed determined by whether the pulley 42 or 47 is driven by the belt. Consequently if the clutch collar 33 be shifted to the left to engage the loose gear 35, that gear will be locked to the shaft 8 and the hub 9 with the bevelled gears 10 and 11 will be oscillated to effect reciprocating or to and fro knitting at the required speed. This mechanism for rotating or oscillating the main shaft and the bevelled gears 10 and 11 at the required speed is set forth in detail in my aforesaid patent and is familiar to those skilled in the art.

The right-hand end of the rod 39 forms a slide bearing for a belt shipper 50 and the right-hand end of the shaft 19 has secured thereto a drum 51 having a peripheral cam flange 52 acting upon a depending lug 53 of the belt shipper to shift the belt, not shown, from one to the other of the pulleys. The belt shipper is held against the face of the flange 52 by a spring 54. A latch 55 for locking the belt shipper with the belt on the loose pulley and a handle 56 for manually moving the belt shipper are provided. This mechanism may be as illustrated in detail in my aforesaid patent.

The knitting needles, which may be of the usual pivoted latch type, are mounted in grooves on the exterior surface of the needle cylinder 57 and with the needles are associated in the grooves of the cylinder pattern jacks of a type similar to those shown in the patent to Grothey, No. 1,678,385, July 24, 1928. The needle cylinder is mounted to rotate and to oscillate with respect to the actuating cams which are relatively fixed. So also the transfer implements, which may be of the type shown in the patent to Scott, No. 1,282,958, October 29, 1918, are mounted in radial grooves on the top surface of the interior dial 58 which rotates and oscillates with respect to the relatively fixed dial cams.

The needle cylinder 57 is keyed at 59 to an extended hub 60 of the bevelled gear 61 having a bearing seat in the bed plate 7 and held in place by the cam ring 62. This gear 61 meshes with and is driven by the bevelled gear 10 on the hub 9. The knitted web descends through a central opening formed in the hub 60 and gear 61. The needle cylinder 57 is supported upon hardened steel pins 63 which rest on bearing rings 64 separated by ball bearings 65. These bearing rings in turn rest upon the top of the tubular column 66 mounted for vertical movement in the table 1. Consequently by raising or lowering the tubular column 66, the length of the stitch may be varied as and when desired.

The interior dial 58 in which the transfer implements are mounted has its vertical shaft geared to the transverse shaft 67 and this shaft is driven by a bevelled gear 68 thereon meshing with a pinion 69 on the vertical shaft 70 which at its lower end carries the bevelled gear 71 meshing with the gear 11 on the hub 9 so that the dial is rotated and oscillated with the needle cylinder all in a familiar manner.

The machine in the preferred form illustrated is particularly designed for knitting a stocking web of the type shown in my application Serial No. 372,017, filed June 19, 1929. For this type of stocking the web is knit continuously beginning at the top and ending at the toe upon a single circular series of needles. By the co-action of these needles and the transfer implements, the stocking web may be formed at the top with a so-called "garter top" or inturned welt. Such a web beginning at the top comprises the following sections, first, a leg section which is knit continuously with round and round knitting on the circular series of needles. This leg section in turn comprises the garter top or inturned welt section, a section of the desired size for the body of the leg, and a shaped section for the calf. Second, an ankle section knit as a continuation of the leg section but by to and fro knitting on a segment of the circular series of needles. This ankle section may comprise an upper ankle section of plain knitting and a lower ankle section presenting at the back a spliced area to give a high spliced heel effect. Third, a heel pocket section knit as a continuation of the web by to and fro knitting on separated segments of needles at the back of the series. Fourth, a foot section knit as a continuation of the web by to and fro knitting and presenting at the side of each edge a spliced area. Fifth, a toe pocket section knit as a continuation of the web by to and fro knitting on a segment of needles at the front of the series so as to eliminate any transverse seam at the front of the web or in the completed stocking at the top over the toes.

A circular series of knitting machine needles and the arrangement for knitting a web having the foregoing sections are illustrated diagrammatically in Fig. 21. This series is shown as divided into segments with the needles in the different segments distinguished by the lengths of their butts by which the operation of the needles is controlled in the machine. Needles having three different lengths of butts are preferably employed and are herein distinguished as long butt needles, short butt needles, and medium butt needles.

Before proceeding to a description of the preferred form of mechanism illustrated for knitting the stocking web, the general nature of the operations performed may be stated as follows. The leg section is first knit by round and round knitting upon the entire circular series of needles, the garter top or inturned welt being formed in the well known manner.

Preferably one or more needles may be omitted at 72 in the middle of the back or the center of the segment 73 of long butt needles to form a marking line for the back seam.

The segment 73 of long butt needles is then thrown out of action casting off the stitches and the needles of this segment thereafter remain out of action, leaving a gap at the back of the web and thereby reducing the web to a width which when seamed together will produce an angle and foot section of the desired size.

The calf section is given the proper shape either by cutting out or removing a triangular section of the web above the gap or by progressively throwing the long butt needles 73 out of action which leaves the yarns floating at the back of the web because until the long butt needles 73 are all thrown out of action, the web is being knit by round and round knitting.

When the calf section has been completed and after the long butt needles 73 are all thrown out of action, the round and round knitting is preferably continued for a few courses to form a small holding section to prevent the knitted web above the gap from ravelling back when the web is held or stretched preparatory to removing the triangular section of knit web or floating yarns in the shaping of the calf section.

After knitting of the entire leg section including the calf section is completed, and preferably after the small holding section just referred to has been completed, the entire remainder of the web is knit by to and fro knitting. In this to and fro knitting the ankle section is first knit, as indicated in the diagram, upon the entire segment of needles remaining in action including the segments 74 and 75 of medium butt needles at opposite sides of the series and the intermediate segment 76 of short butt needles at the front of the series. This results in leaving a selvage along each side of the gap at the back of the web with no yarn floating across this gap. This selvage, as will be apparent from the operation of the machine, is preferably produced by preventing each edge needle 77 from taking the yarn on the reciprocation away from the edge and by causing each of these needles to knit only on the reciprocation toward the edge. After each reciprocation toward the edge, as a result of which the needle 77 knits as usual, this needle may be raised so that on the return reciprocation away from the edge, the yarn is laid beneath the latch.

The lower portion of the ankle section is also spliced by throwing in yarns during the to and fro knitting at each side of the gap so as to produce a spliced area at each side of the gap. This area may present at its edge in the knitted web any desired design and the entire spliced area may be of any desired length, thus producing any desired type of spliced or high spliced heel. As will appear, the splicing yarn is so knit into the web that no fringes, cut ends of yarn, or other unsightly construction appear at the edges of the spliced areas.

It will be noted that the holding section constituted by the yarn floating across the gap during the latter part of the round and round knitting extends to the beginning of to and fro knitting, as shown in my aforesaid application, Serial No. 372,017, and that consequently the length of the holding section depends upon the period at which the long butt needles 73 are thrown out of action. So also the length of the spliced area in the ankle section depends upon the period at which the splicing yarns go into action during the to and fro knitting and while this spliced area must extend at least through the lower portion of the ankle section, its upper limit may be located at any point upon the conclusion of the courses of round and round knitting.

At the conclusion of the knitting of the ankle section with its spliced area, the segment 76 of short butt needles at the front of the series is thrown out of action retaining the stitches and the heel pocket section is then formed by to and fro knitting upon the two segments 74 and 75 of the medium butt needles remaining in action. During the formation of this heel pocket section, the needles at the front of each segment 74 and 75 are operated as usual to perform the narrowing and widening operation. During the to and fro knitting for the heel pocket section, the yarn floats across the gap at the back where the segment 73 of long butt needles is out of action and this floating yarn is removed before the web is seamed together.

It will be noted that the to and fro knitting employed in the knitting of the ankle section is across the front of the web, while the knitting of the heel pocket section is across the back of the web. This is enabled to take place by automatically shifting the hub 9 with respect to the driving shaft 8 180° at the beginning of the heel pocket section.

At the conclusion of the knitting of the heel pocket section, the segment 76 of short butt needles which are holding the yarn is restored into action, the hub 9 is again shifted 180° with respect to the driving shaft 8 and to and fro knitting is continued at the front of the web on the segments 74 and 75 of medium butt needles and the segment 76 of short butt needles to knit the foot section in the same manner as the ankle section was knit. But during the knitting of this foot section splicing yarns are preferably thrown in to form spliced areas of any desired width and presenting inner edges of any desired configuration at each side of the gap just as in the knitting of the spliced areas in the lower portion of the ankle section. The foot section, it will be observed, is also knit with selvaged edges at the gap.

At the conclusion of the knitting of the foot section, the segments 74 and 75 of medium butt needles are thrown out of action retaining the stitches and to and fro knitting continues on the segments 76 of short butt needles which are now alone in action with the usual narrowing and widening operation performed upon the needles of this segment at each edge and thus the toe pocket section is knit at the front of the web.

At the conclusion of the knitting of the toe pocket section, it is usually desirable to restore the segments 74 and 75 of medium butt needles to action and knit with to and fro knitting a few courses which are subsequently ravelled out when the web is stitched and looped together.

The construction and operation of the mechanism for selecting and controlling the movements of the needles is shown as on the principle of that disclosed in the patent to Grothey, No. 1,678,385, above referred to. Each groove in the needle cylinder 57, with the possible exception of the grooves where the needles 72 are omitted, contains a needle 78, a restoring jack 79, and a pattern jack 80, see Fig. 6. The cams which act directly upon the pattern jacks to raise and lower the same are carried by the cam ring 62 mounted in the bed plate 7. The cams and devices which act upon the restoring jacks and upon the needle butts are carried by the plate or cam ring 81 mounted in the upper bed plate 82 which is supported from the bed plate 7 by the posts 83. As in my aforesaid patent, No. 1,695,734, the post 84 secured to the cam ring 81 and the bracket 85 secured to the bed plate 82 support the latch ring 86 pivoted at 87 to the top of the bracket 85 and releasably held by the catch 88 to the top of the post 84.

The cams and devices for acting upon the needle butts, upon the butts of the restoring jacks, and upon the butts of the pattern jacks are shown developed in Fig. 11.

Figure 6:
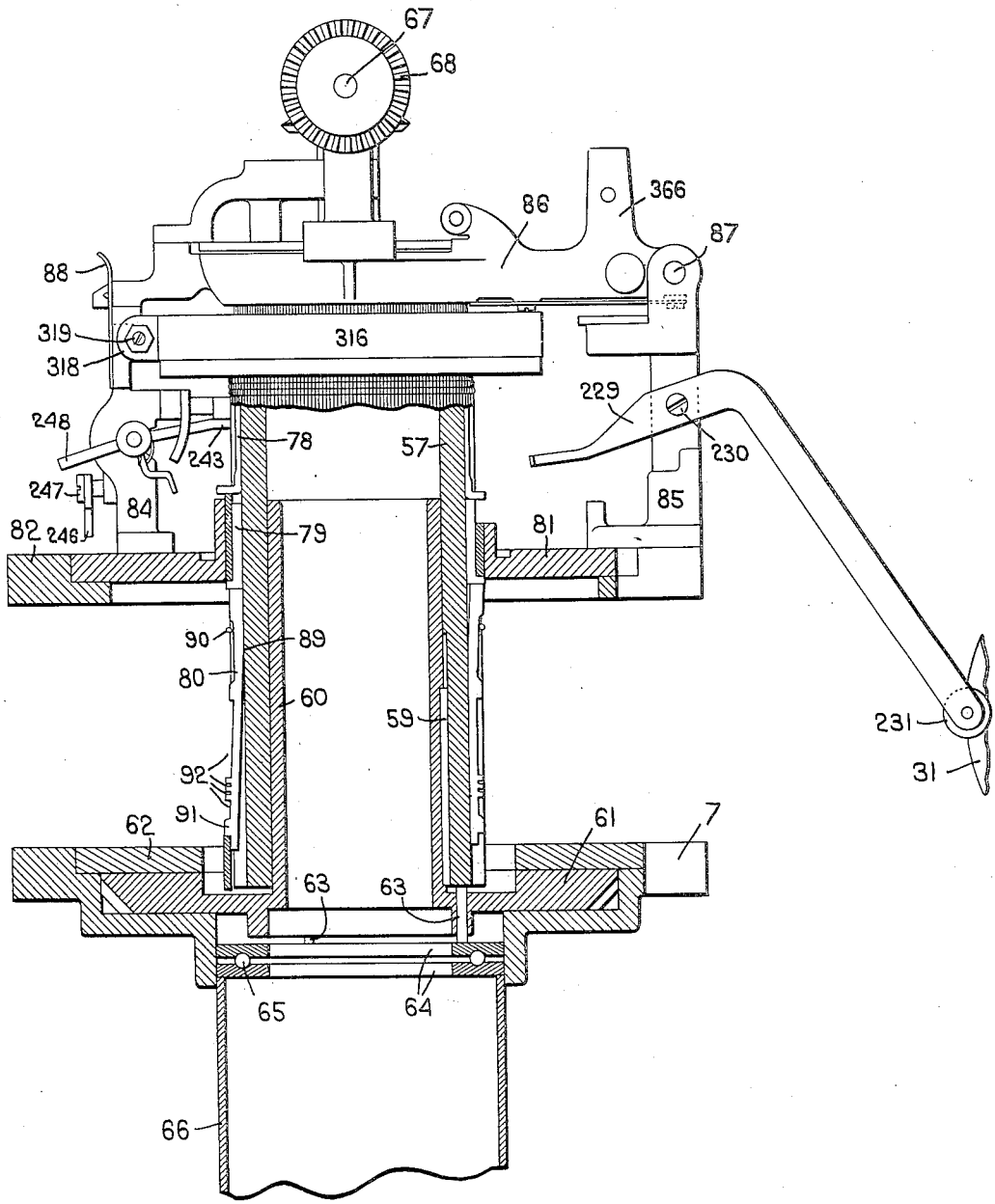
Fig. 6 is a view chiefly in central vertical cross section taken through the cylinder.

The pattern jacks 80, see Fig. 6, rock upon a fulcrum point 89 at the inner edge and are held in place by the usual spring band 90. These jacks have at their lower ends the butts 91 to cooperate with the cams carried by the cam ring 62. Above the butts 91 these jacks are provided with an outer straight edge which is broken away or cut in to form notches or depressions of various lengths and position such as 92. Consequently a selector acting upon this straight edge will hold the jacks in the grooves with the butt 91 out of engagement with the cams, but when the selector is positioned opposite a notch, according to the desired control, the lower end of the jack may swing outwardly to cause its butt to cooperate with the cams. The selector mechanism for controlling the pattern jacks is shown as to its chief elements in Fig. 7. Two vertical posts 93 and 94 extend between the cam ring 62 and the cam ring 81 and upon these posts are mounted respectively the selector blades 95 and 96. These blades are moved downward by the helical springs 97. The blade 95 is moved upward against its spring by the end of a lever 98 extending beneath the blade and fulcrumed on the shaft 99 supported in the side frames 4 and 5. This lever cooperates at its lower end with the step cam 100 on the drum 29 so that under the control of the drum the selector blade 95 may be moved to any desired vertical position. In a similar manner, the selector blade 96 is operated by a screw 101 extending beneath it from the end of a lever 102 also fulcrumed on the shaft 99 and cooperating with the step cam 103 on the drum 29.

A cam 104 secured to the cam ring 62 at the rear acts upon the outer faces of the pattern jack butts as they pass in either direction to force the lower ends of the pattern jacks inward. A cam 105 secured to the cam ring 62 near the front of the machine also acts to force inward the lower ends of all the jacks except those provided with a notch opposite this cam as they pass.

An upper selector blade 106 is fulcrumed on the post 94 opposite the upper ends of the pattern jacks and presents at the front of the cylinder a cam edge 107 and at the right, forward of the effective end of the selector blade 96, a cam head 108. This upper selector blade 106 is rocked on its fulcrum 94 to bring either the cam 107 or the cam 108 into position to force the upper ends of the pattern jacks inward and consequently the lower ends outward. For this purpose links 109 and 110 extend rearwardly from the end of the blade 106 and are acted upon respectively by thrust bars 111 and 112 guided in the bracket 113 and operated by cam surfaces on the pattern drum 12. A cam 114 fixed to the post 93 having its effective end forward of the effective end of the selector blade 95 acts against the upper ends of the pattern jacks to force them inward and consequently to force the outer ends outward. A restoring cam 115 secured to the cam ring 62 acts forward of the cam 114 to force the lower ends of the pattern jacks inward when the cylinder is rotating in one direction. Vertical guides 116 secured to brackets 117 mounted on the cam ring 62 serve to maintain the active ends of the selector blades 95 and 96 in vertical paths.

Figure 7:
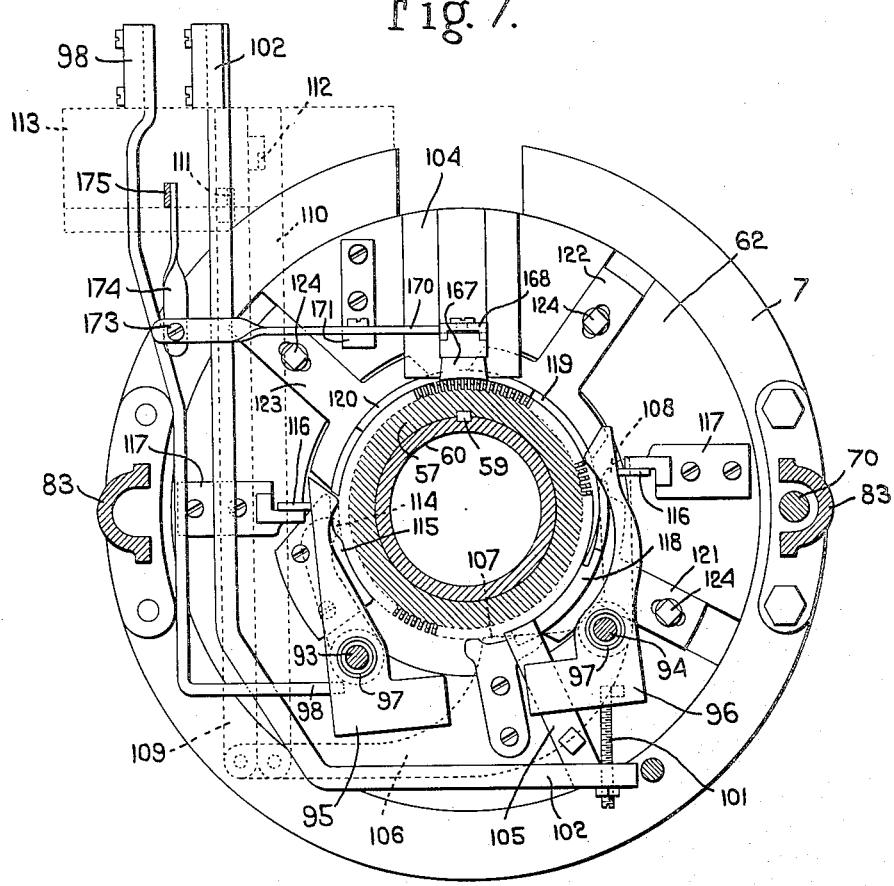
Fig. 7 is a top plan view looking toward the lower bed plate and on a section taken below the upper bed plate.
Figure 8:
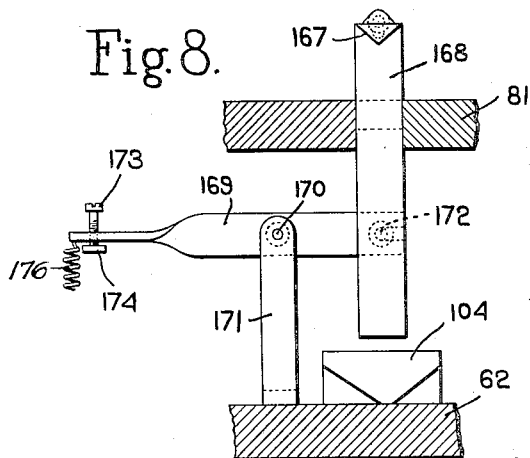
Fig. 8 is a front elevation of the cam for forcing the pattern jacks inward and of the center cam with the means for raising and lowering it.
Figure 12:
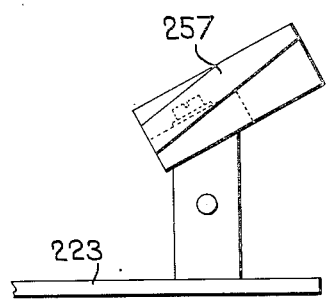
Fig. 12 is a front elevation of the depressing cam and its mounting.
Figure 13:
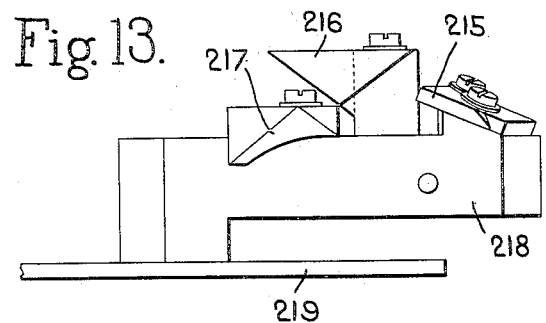
Figs. 13 and 14 are front elevations of certain cams and their mountings for preventing the gap needles from taking yarn during to and fro knitting.
Figure 14:
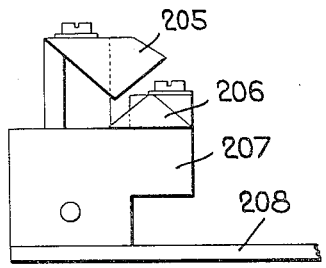
Figure 15:
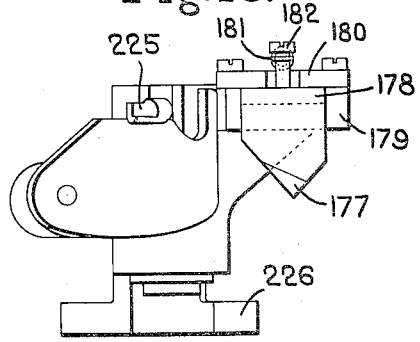
Fig. 15 is a front elevation of a picker and a cam for raising the needles and their mountings.

The cams for raising the pattern jacks when the lower ends of the pattern jacks are outward are shown as three in number, 118, 119, and 120, see Figs. 7 and 11, and are carried by slides 121, 122, and 123 mounted in radial grooves in the cam ring 62 and held in the required adjustment by bolts 124.

It will thus be seen that there is presented by the mechanism thus described a very flexible arrangement for selecting as required by the different sections of the knitted web the needles required in the various operations both during round and round and during to and fro knitting. Any pattern jack which under the control of the selecting mechanism is left with its lower end projecting outward as it passes one or the other of the cams 118, 119, and 120 is raised thereby, thus raising the restoring jack and the needle above it in its groove. This arrangement with the control of the needles by the various cams and devices acting upon the needle butts enables all the desired operations readily and automatically to be performed as desired.

The restoring jacks 79 which act to move the pattern jacks downward in their grooves are controlled by cams carried by the cam ring 81 and shown at 125, 126, and 127 in the development in Fig. 11, these cams being located respectively above the cams 118, 119, and 120 which raise the pattern jacks.

Figure 5:
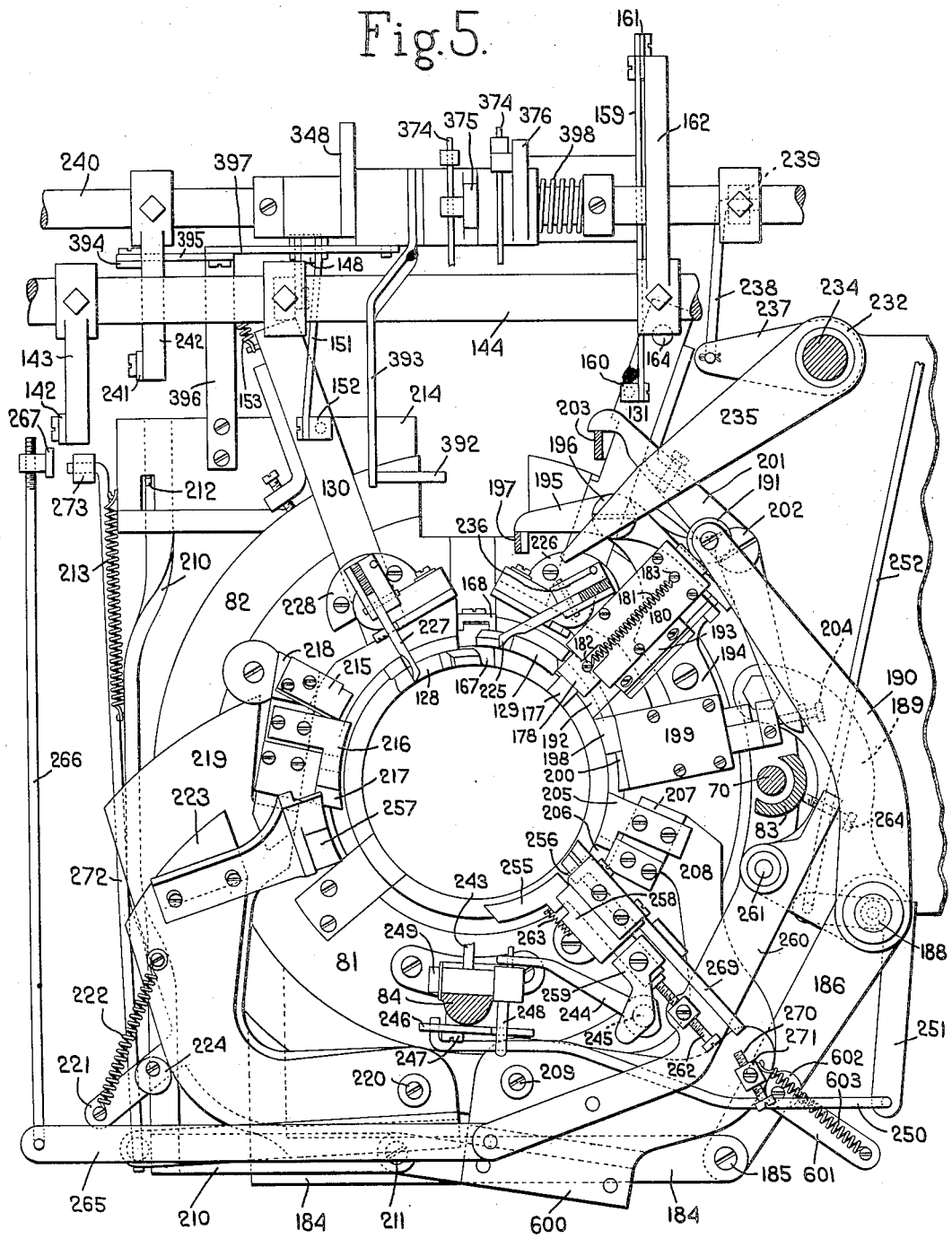
Fig. 5 is a top plan view of the main portion of the machine with the dial and its supports removed.

The cams and devices for operating the needles by their butts are shown in the upper portion of the development of Fig. 11 and for the most part in the plan view in Fig. 5. A number of novel features are here employed in order to enable the machine to knit the desired character of web. The machine in knitting the ankle and the foot must have a relative to and fro or reciprocatory movement between the needle cylinder and cams of a very much greater angle than usually employed in knitting to and fro work. When knitting to and fro work in the formation of the ankle, foot, and toe pocket sections of the stocking, the knitting takes place at the front of the web, while in the knitting of to and fro work to form the heel pocket, which is knit in two sections, the to and fro work takes place at the back of the web and across the gap at the back. These and other considerations render the mechanisms heretofore used inadequate or unsuitable.

In order that the stitch cam shall function properly at the stitching point during both round and round and to and fro knitting of the extent and character here described, it is necessary to make the stitch cam in two parts, to provide means for holding one part out during round and round knitting, and means for alternately moving the two parts in and out during reciprocating knitting. For this reason two stitch cams 128 and 129 are provided and mounted respectively upon the generally radially movable slides 130 and 131 mounted in the bed plate 82 and cam ring 81. The stitch cam 128 presents the cam surface 132 for depressing the needle butts when the needles are moving toward the left, viewing Fig. 5, the pocket 134 to receive the end of the picker when depressed, and the pocket 135 to receive the picker when elevated. The stitch cam 129 is provided with generally similar cam surfaces and pockets 137, 139, and 140. The needles to be raised by the pickers are in all cases selected and raised into the path thereof by the pattern jacks.

In order to move the stitch cam 128 as required in the knitting operation, the slide 130 upon which it is mounted is controlled by suitable connections both from the pattern drum 12 and from the drum 31. A thrust bar 142 operated by suitable cams on the pattern drum 12 is pivotally connected at its upper end to an arm 143 secured to the shaft 144 extending transversely at the back of the machine and journalled in the side frames. This shaft 144 has secured to it a depending arm 145 provided at its lower end with a screw 146 riding in the slot of a slotted link 147. This link at its opposite end is pivoted to the upper end of the follower arm 148. This follower arm is journalled on the shaft 99 and carries a roll 149 riding against a cam 150 on the drum 31. A link 151 connects the upper end of the follower arm 148 with a post 152 swivelled on the cam slide 130. A spring 153 connecting the slide 130 to the machine frame holds the slide yieldingly outward and the roll 149 against the drum 31. Consequently upward movement of the thrust bar 142 by the cam on the pattern drum 12 will move the slide 130 inward to place the stitch cam 128 in active position and will hold it in place as determined by the high part of the cam or during the period of round and round knitting.

When, however, to and fro knitting takes place and the stitch cam 128 has to be moved in and out as the direction of reciprocation changes, the control of the slide 130 is transferred to the drum 31 which, it will be remembered, is always rotated in one direction by a geared connection to the main shaft. At this time the thrust bar 142 is lowered or drops on to a low part of the cam on the pattern drum 12, thus allowing the link 147 to move idly on the screw 146 and permit the cam 150 on the drum 131 to control the in and out movement of the slide 130 through the follower arm 148 and link 151 at each rotation of the drum 31.

The other stitch cam 129 and its slide 131 are controlled in a similar manner, but in this case it will be remembered that the slide 131 is not to be moved in during round and round knitting. A follower arm 154 journalled on the shaft 99 is provided with a roll 155 cooperating with a cam 156 on the drum 31 and carries at its upper end a stud 157 engaging in an angle slot 158 of a link 159 pivoted at its enner end to a post 160 swivelled on the slide 131 and at its outer end to a link 161 depending from an arm 162 secured to and projecting rearwardly from the shaft 144. A spring 163 extends from a post 164 on the slide 131 to the frame of the machine and acts yieldingly to hold the slide 131 outward. It will be seen that when the thrust bar 142 is raised by the pattern drum 12, as when round and round knitting takes place, the stud 157 will be in the horizontal portion of the angular slot 158 and no movement of the slide 131 will take place and consequently the stitch cam 128 will remain withdrawn. When, however, the thrust bar 142 drops, as when to and fro knitting is to take place, the outer end of the link 159 will be raised and the stud 157 will be in the vertical portion of the angular slot 128 and consequently the slide 131 will be moved in and out under the control of the cam 156 on the drum 31. The cam ring is provided with the usual fixed raising cams 165 and 166 at either side of the stitch cams.

The center cam 167 located between the stitch cams is moved up and down so as to be in action during to and fro knitting under the control of cams on the pattern drum 12. For this purpose this cam 167 is mounted on a vertical slide 168 in the cam ring 81. A lever 169 fulcrumed at 170 on a post 171 secured to the plate 62 has a pin and slot connection 172 with the slide 168 and at its other end carries an adjustable screw 173 resting upon the offset end 174 of a thrust bar 175. A spring 176 connects the lever 169 to a fixed portion of the machine and thus holds it in contact with the thrust bar. The thrust bar is operated by suitable cams on the pattern drum 12.

When round and round knitting is performed, the stitch cam 129 is withdrawn and consequently a cam is provided to raise the needles sufficiently to carry the latches through the loops before they reach the stitch cam 128. For this purpose the cam 177 is provided and remains in action excepting when the stitch cam 129 is in action. This cam is conveniently carried by a radial slide 178 mounted in a slideway formed in a projecting portion 179 of the support for the adjacent picker, hereinafter described. A cover plate 180 holds the slide in place. A spring 181 connecting a stud 182 on the slide to a stud 183 on the cover plate acts to retract the cam. The cam is moved into position and held therein by a thrust bar of the usual type, not shown, operated by the pattern drum 12 which operates an angular arm 184 loosely pivoted at 185 to the lever arm 186 projecting from a sleeve 187 fulcrumed on the post 188 carried by a bracket 189 bolted to the bed plate 82. A lever arm 190 secured to the sleeve 187 carries a roller 191 abutting the outer end of the cam slide 178. Consequently when the thrust bar is raised by the pattern drum, the cam 177 is moved into position, and when the thrust bar is lowered, the spring 181 withdraws the cam from position.

In the knitting of the garter top or inturned welt three cams are employed which are controlled and operated in a manner similar to corresponding cams shown in the aforesaid Patent No. 1,282,958. The first cam 192 acts to divide the needles raised by the pattern jacks as determined by the selector cam 105 from those not raised so that the needles raised will pass above the cam 192 and receive yarn, while those not raised will be deflected down by the cam 192 so as not to receive yarn. This cam 192 is mounted to slide radially in a slideway 193 mounted in a bracket 194 secured to the cam ring 81. A lever 196 is fulcrumed at 196 on the bracket and is operated by a thrust bar 197 controlled by the pattern drum 12 to move the cam 192 into position when required against the action of a spring, not shown. The second cam 198 is brought into action for a short period to limit one of the operations to a single course and is moved in only sufficiently far to act upon the long butt needles and causes all the long butt needles as they pass this cam to be raised thereby into yarn receiving position. This cam 198 is mounted in the slideway 199 in which is also mounted the third cam 200 which is a transfer cam for depressing alternate needles selected by the pattern jacks. The two cams 198 and 200 both slide radially in the slideway 199 and are operated by a single lever 201 fulcrumed on a projection from the bracket 194 at 202. This lever is operated by the thrust bar 203 controlled by the pattern drum 12 and has an adjustable set screw 204 in its end abutting a projection on the slide of the cam 200. In one position of the thrust bar the cam 200 moves inward and carries the cam 198 into position to engage the long butt needles but leaves the cam 200 out of engagement with any of the needles. In another position of the thrust bar the cam 200 is carried further inward so as to act upon the butts of all lengths, the cam 198 at this time having no function although moved further inward.

When it is desired to form the gap at the back of the web with a few courses of floating yarn so as to prevent the web above the gap from ravelling back, it is necessary to prevent the long butt needles from taking yarn or to cause them to cast off the yarn during these courses of round and round knitting. For this purpose the cams 205 and 206 are provided, the latter cam raising the long butt needles sufficiently to push their latches up through the loops and the former cam then drawing these needles down sufficiently to bring them into the path of the cam 192 which thus causes them to cast off the yarn as they pass the stitching point. These cams are mounted on a support 207 secured on an arm 208 fulcrumed at 209 on the bed 82. The arm 208 is operated by the lever 600 also fulcrumed at 209. For this purpose the arm 208 is provided with an extension 601 in which is mounted an adjustable eccentric 602 abutting the edge of the lever 600. A spring 603 connects the extension 601 and the lever 600 so that the arm 208 moves with the lever 600 but the lever 600 is permitted a further inward and outward movement when the cams 205 and 206 are in their inner position. An arm 210 is pivotally secured at 211 to the opposite end of the lever 600 and is operated by a thrust bar 212 from the pattern drum 12 and against the action of a spring 213 which connects the bar 210 to the bracket 214 secured to the bed plate 82 and through which the thrust bar 212 moves.

In order to prevent the section of long butt needles from taking yarn during to and fro knitting a set of cams similar to the cams 192, 205, and 206 are provided at the opposite side of the stitching point. These are the cams 215, 216, and 217. These cams are all mounted upon the single support 218 carried by an arm 219 pivoted on the bed plate 82 at 220. This arm is also provided with an extension 221 connected by a spring 222 with an overlying lever 223, hereinafter described, and fulcrumed at 220. An adjustable eccentric 224 on the extension 221 abuts the edge of the lever 223 so that when the lever 223 is swung inward, the cams 215, 216, and 217 are moved into position, and when the lever 223 is swung to its outermost position, these cams are moved out of position. Thus, while the lever 223 positions the cams 215, 216, and 217, it may have a further inward and outward movement when these cams are at their inner position, as in the case of the corresponding lever 600.

The picker and dropper mechanism employed is of the usual type and therefore needs no extended description. The picker 225 at the right is mounted on a support 226 carried by the cam ring 81 and this support is the one provided with the projection in which is formed the slideway 179 for the cam 177. The picker 227 at the left is carried by a similar support 228. Since in forming the stocking web in accordance with this invention it is necessary for to and fro knitting to take place with a much greater angle of rotation of the needle cylinder than ordinarily employed, the needles would be likely to strike the picker. To prevent this, a lever 229 (see Fig. 6) is fulcrumed at 230 on the bracket 85. This lever extends beneath the path of one of the pickers at its inner end and at its outer end is provided with a roll 231 controlled by a cam on the drum 31. The action of this lever is to raise the picker slightly so that it will be out of the path of the needle butts on reciprocating and it is found sufficient to apply this mechanism to but one of the pickers with the setting employed.

The formation of the web by means of to and fro knitting throughout that portion extending from the toe to the calf not only enables the web to be shaped to the ankle and foot without distorting the web and without material waste of yarn, but it also enables selvages to be provided where the web is seamed together at the back, which is highly desirable, and avoids the difficulties which occur in seaming together the cut edges of the web. In this invention each edge of the gap at the back, with the exception of the heel pocket section, is formed with an elastic selvage and for this purpose the picker and dropper mechanism is preferably employed and, in the preferred construction illustrated, this mechanism acts throughout the to and fro knitting of the ankle and foot portions for this purpose. The dropper is moved by its controlling mechanism into operative position. Consequently during each reciprocation the advancing needle 77 at the edge of the gap is raised by the picker in the same manner as in the usual narrowing and widening operation. But as the dropper is also in operation and as but a single needle 77 has been raised, the dropper thereafter acts to depress this single needle in the same manner that it acts in the narrowing operation. As only this single needle 77 has been raised, it follows that this is the only needle which is dropped or depressed by the dropper. Thus at each reciprocation of the segment 74 or 75 toward the stitching point, the leading needle 77 does not take the yarn, but upon the alternate reciprocation does take the yarn so that the yarn floats laterally at each edge from alternate to intermediate courses forming a selvage according to the method set forth in my aforesaid application No. 372,017. When, as hereinafter pointed out, spliced or reinforced areas are produced in the web and extend to the selvage, both the splicing yarn and the body yarn are knit in the same manner to form the selvage.

While the pickers and dropper are employed in forming a selvage at the edges of the gap at the back of the web during to and fro knitting, it is necessary that the pickers shall not act to raise the medium butt needles at the edge of the gap during the formation of the heel pocket because the yarn at this time floats across the gap. Since the oscillatory movement of the needles in the formation of the heel pocket starts with the gap left by the long butt needles at the rear of the machine, the first needle 77 of the sector 74 of medium butt needles, viewing Fig. 21, will engage the picker 225 and be raised thereby. Means are therefore provided to move this picker out of the path of the advancing sector 74 of medium butt needles at the beginning of the to and fro knitting. For this purpose a lever 232 has a hub 233 fulcrumed on the post 234. The upper arm 235 of this lever extends behind a stud 236 projecting up from the rear end of the picker 225. The lower arm 237 of this lever is connected by a link 238 to an arm 239 secured to and depending from the shaft 240 mounted transversely of the machine at the rear in the side frames. The thrust bar 241 operated by a cam on the pattern drum 12 rocks the shaft 240 by a connection to the arm 242 secured to and extending forwardly from the shaft. This mechanism acts to withdraw the picker 225 until the sector 74 of medium butt needles has passed and then goes out of action, leaving the pickers to act in the usual manner.

The dropper 243 is mounted and swivelled in the post 84 at the front of the machine and acts and is operated in the usual manner. But in knitting a web in accordance with this invention, it will be seen that the angular movement of the needle cylinder in the to and fro work is much greater than usual. This extended to and fro movement of the cylinder would cause the dropper to act twice during each oscillation when narrowing and widening in formation of the toe pocket, thus dropping four needles instead of two at each oscillation. Provision is therefore made to prevent the dropper from acting twice during each oscillation. It will be remembered that the dropper during the ordinary narrowing operation is swung downward to its idle position as by an arm 244 controlled by the vertical controlling rod 245. In this invention additional means are provided for moving the dropper to this lower idle position when necessary, as in the knitting of the toe pocket. A lever 246 is fulcrumed at 247 on the post 84 and extends beneath a projection 248 from the dropper shaft 249. The downwardly projecting arm of the lever 246 is connected by a link 250 to a bell crank lever 251 fulcrumed on the post 188. A link 252 extends rearward from the bell crank lever 251 to an arm 253 journalled on the shaft 240. This arm at its lower end carries a follower 254 cooperating at the required time with the cam on the slide drum 32.

In the knitting of the heel and toe pockets, the sections of needles which are not employed are thrown out of action in the usual manner by elevating their butts above the paths of the various cams. In knitting the heel pocket, the section of short butt needles 76 is thus elevated holding the yarn, while in the knitting of the toe pocket, the section of long butt needles 72 is elevated and the sections of medium butt needles 74 and 75 are elevated holding the yarn. In order to elevate and restore these needles, there is provided a switch cam 255 and two depressing cams 256 and 257. The switch cam 255 is of the usual type mounted to slide radially and to rock in the support 258 on the cam ring 81. The rocking motion is given by the vertical controlling rod 245 engaging an arm 259 projecting from the shank of the cam while the inward and outward movement of the switch cam is given by a lever 260 fulcrumed at 261 on the bracket 189. This lever is provided with an adjusting screw 262 abutting the end of the shank of the switch cam and acts in opposition to a spring 263 connecting the switch cam to its support 258. The rearward end of the lever is provided with a set screw 264 abutting the post 83 to limit the inward movement thereof. The forward end of the lever is provided with an extension 265 connected by a link 266 to a lever 267 fulcrumed on the shaft 268 and controlled by cams on the pattern drum 12.

The depressing cam 256 is carried by a slide 269 mounted to move radially in the support 258 for the switch cam and is operated by a set screw 270 carried by the post 271 on the lever 600. The corresponding depressing cam 257 is carried by the lever 223 which, it will be remembered, operates the arm 219. This lever is connected by a link 272 to the lever 273 fulcrumed on the shaft 268 and operated by cams on the pattern drum 12.

Both depressing cams 256 and 257 are for the same purpose, that is, when the switch cam is to act to elevate the section of short butt needles 76, these cams are moved inward sufficiently to act upon and depress the medium and long butt needles carrying them down below the point of the switch cam when the switch cam is in its depressed position. The switch cam is then depressed and moved in sufficiently to stand beneath the path of the short butt needles and thus acts to elevate them out of position. These depressing cams 256 and 257 remain in action only for one complete to and fro movement of the needle cylinder, but the latter cam must not be withdrawn until the switch cam has been raised out of the path of the needles that have not been elevated. When it is desired to restore the short butt needles, the switch cam is elevated and moved in as usual.

When the long and medium butt needles are to be raised out of action, as in knitting the toe pocket, the switch cam as usual, is depressed and moved in sufficiently only to engage the butts of these needles. So also when these needles are to be restored to action, the switch cam as usual is elevated and moved in sufficiently to engage and depress these needles. Normally the switch cam stands retracted and in horizontal position and normally also the depressing cams stand retracted.

Figure 3:
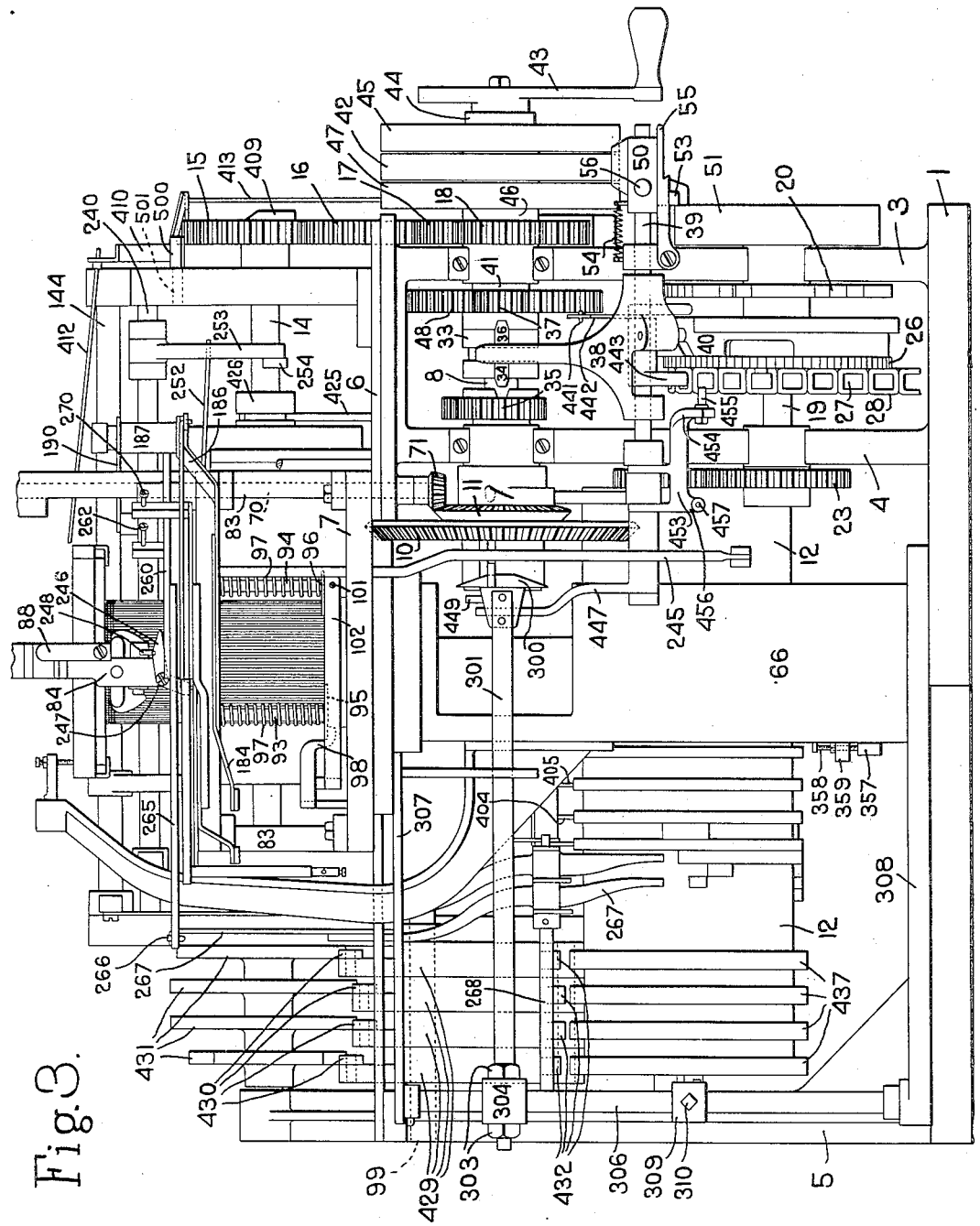
Fig. 3 is a view in front elevation of the main portion of the machine.

In knitting the stocking web in accordance with this invention, the to and fro knitting takes place across the front of the web in knitting the ankle, across the back of the web in knitting the heel pocket, and across the front of the web in knitting the foot and toe sections. In order to produce this result, the invention provides means for automatically shifting the relative position of the needle and cam cylinders 180° both at the beginning and at the conclusion of the knitting of the heel pocket section. In the preferred construction this is accomplished by a clutch connection between the main shaft 8 and the hub 9 carrying the gears 10 and 11 which rotate the needle cylinder and the transfer implement dial and by automatically operating this clutch to cause a shift of the hub with respect to the shaft through 180° at the beginning and at the end of the knitting of the heel pocket section. The control of this clutch is conveniently secured from a cam located on the outer left-hand end of the pattern drum 12. The details of a preferred form of the clutch construction are shown in Figs. 24 to 28, inclusive, and the cam and operating connections extending to the clutch in Figs. 1 and 3. A clutch plate 274 is secured to the unit comprising the hub 9 and the gears 8 and 11. This clutch plate 274 is arranged to have a slight give or yield rotarily with respect to the hub so as to take up the shock caused when the clutch operates. For this purpose the plate is provided with an arm 275 secured thereto at 276. This arm extends radially outward and then concentric with the periphery of the gear 10. Its free end is connected by a powerful spring 277 to the gear at a point 278. A slot or aperture 279 in the arm 275 fits over a stud 280 rigid in the gear and of smaller size than the aperture so that a slight rotary movement of the clutch plate may take place against the tension of the spring 277. The other clutch member which cooperates with the plate 274 is firmly secured to the shaft 8. It is shown as comprising a block 281 keyed to the shaft at 282 and also fastened thereto by the set screw 283. The clutch connection between the block 281 and the plate 274 is effected by means of two locking pins 284 and 285 mounted in the block and a hole 286 cooperating with the pins in the plate. The pins slide in bores in the block parallel with the shaft and at the same radial distance therefrom as the hole in the plate are slightly tapered at their ends. The pin 284 is operated by a lever 287 fitted in a slot 288 extending transversely through the block and the shaft and fulcrumed on a pin 289 held in place by a set screw 290. This lever is connected to the pin 284 by a spring pressed pin 291 sliding in the lever and having a ball and socket connection with the pin. A spring 292 acts between the block and the lever normally to project the pin toward the clutch plate 274. The outer end of the lever 287 is slotted at 293 and its extreme outer end presents the extension 294. A similar lever 295 mounted in a similar transverse slot 296 in the block 281 and in the shaft 8 and fulcrumed on the pin 297 is controlled by the spring 298 to operate the pin 285. This lever extends downwardly with its end 299 at the same radial distance from the center of the shaft 8 as the recess 293 in the lever 287.

Figure 24:
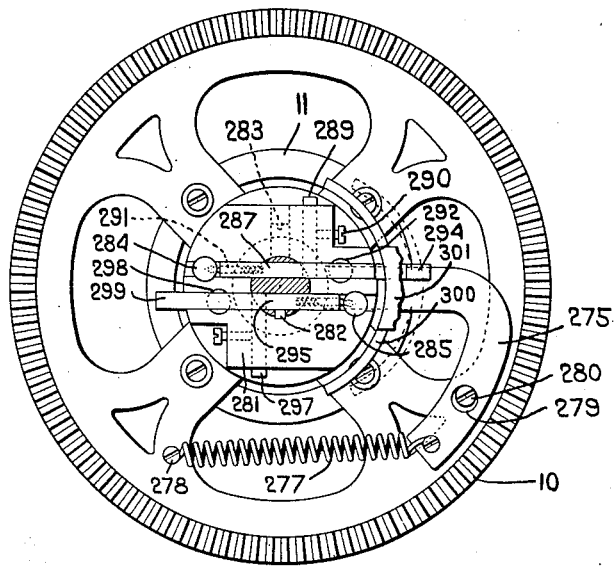
Fig. 24 is a side elevation looking toward the right showing the clutch connection between the driving shaft and the hub carrying the bevelled gears for driving the cylinder and dial.
Figure 26:
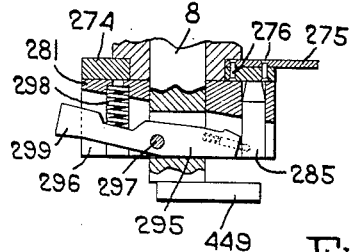
Fig. 26 is a transverse section of a portion of the construction shown in Fig. 24 illustrating one of the clutching mechanisms.
Figure 25:
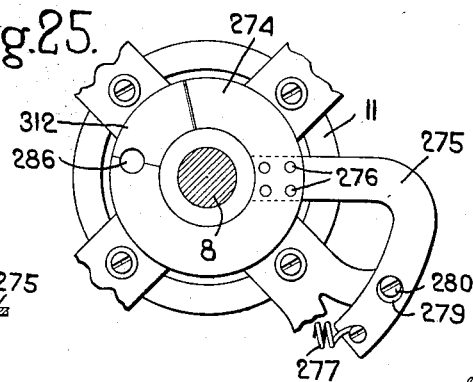
Fig. 25 is a similar side elevation of a detail of the construction shown in Fig. 24.
Figure 27:
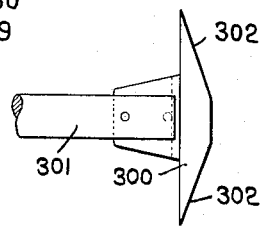
Fig. 27 is a front elevation of a detail of the clutch operating cam.

A controlling cam 300 for operating the levers is mounted on a rod 301. This cam presents an arcuate body extending concentric with the shaft and has its face beveled off at 302. The rod 301 extends transversely across the front of the machine and is adjustably secured by means of the nuts 303 in a block 304 adjustably and rigidly secured in turn by a set screw 305 to a vertical shaft 306 mounted at its upper end in a bracket 307 extending laterally from the bed plate or frame of the machine and at its lower end in a bracket 308 extending from the base 1 of the machine. An arm 309 is rigidly and adjustably secured to the shaft 306 by the set screw 310 and is provided at its ends with pins 311 cooperating with cam surfaces on the end of the pattern drum 12. Up to the time the machine is to begin the knitting of the heel pocket section, the parts stand with one of the pins 284 or 285 in engagement with the hole 286 or, for example, as illustrated in the drawings with the pin 284 controlled by the lever 287 clutched into the hole 286 of the clutch plate 274 and with the controlling cam 300 aligned with the recess 293 in this lever. When the time arrives to shift the angular position of the hub 9 with its gears 10 and 11 on the shaft 8 so as to cause the to and fro knitting to take place at the opposite side of the web from that employed in the knitting of the ankle section, the pattern drum 12 acts to rock the shaft 306 and thus to shift the controlling cam 300 away from the center of the shaft 8 into the position shown in dotted lines in Fig. 24 where it stands in line with the extension 294 of the lever 287. Immediately with the rotation of the shaft 8, the lever 287 is rocked upon its pivot by the controlling cam withdrawing the pin 284 from clutching engagement with the plate 274, thus stopping the drive of the hub 9 with its gears 10 and 11. As soon as the clutch block 281 which is keyed to the shaft has rotated 180°, the clutch pin 285 is depressed by the lever 295 into the hole 286 in the clutch plate 274, a slight recess 312 in the plate assisting in guiding the clutch pin into the hole and the drive of the hub 9 and therefrom of the cylinder and dial is resumed with the to and fro knitting operation for the heel pocket section taking place on the opposite side of the web from that employed in knitting the ankle section. The controlling cam 300 now remains in its outer position during the knitting of the heel pocket section, but as the pin 284 is now seated on the face of the clutch plate 274 holding the lever 287 with its outer end pressed toward the clutch plate, the controlling cam no longer acts on this lever and as the end 299 of the lever 295 does not extend out as far as the extension 294 of the lever 287, the controlling cam has no effect on it also. When the knitting of the heel pocket section is completed, the pattern drum again acts and the controlling cam 300 is shifted to its inner position or in radial alignment with the recess 293 in the lever 287 and in radial alignment with the end 299 of the lever 295, as shown in Fig. 24. As soon, then, as this end 299 passes the controlling cam, the pin 285 is withdrawn from the clutch plate, the hub 9 ceases to rotate and the block 281 after making a half rotation brings the pin 284 opposite the hole 286 and the block is again clutched to the plate 274 in the position it occupied during the knitting of the ankle section of the web. Each time either of the pins clutches into the hole 286 of the clutch plate, the spring 277 gives slightly, thus taking up the shock, but as this spring immediately draws and holds the arm 275 snugly against the stud 280, there is only a momentary yield of the clutch plate 274 with respect to the hub 9.

The mechanism for supporting and operating the transfer elements, the sinkers or web holders, and the other elements at the head of the needle cylinder, except as particularly described herein, may be and is illustrated as of the same general construction as shown in the before-mentioned patents. The web holders or sinkers over which the stitches are drawn are constructed and operated substantially as in my aforesaid Patent No. 1,695,734. These sinkers 313 slide in radial grooves in the sinker bed 314 rigidly mounted upon the extreme upper end of the outer face of the needle cylinder 57 and the inner ends are guided by an annular member 315 secured to the inner upper end of the needle cylinder. The sinker cam ring 316 rests upon the sinker bed and contains the usual cam groove 317 for operating the sinkers 313 through their butts. This cam ring is provided with lugs 318 containing adjustable set screws 319 abutting opposite sides of the post 84 and thus maintaining the rotary position of the sinker cam ring fixed with respect to the main cam ring 81.

The transfer implements are constructed and operated in general as in the aforesaid Patent No. 1,282,958. The interior dial 58 already referred to is supported by a central vertical shaft or a spindle journalled in the hub 320 of a bracket 321 arched over and mounted upon the latch ring 86 so that the dial axis aligns with the needle cylinder axis. A gear 322 at the top of this spindle meshes with a gear 323 on the transverse shaft 67 already described. Nuts 324 on the end of the dial spindle above the gear 322 enable the dial to be adjusted vertically. The dial 58 is provided with the usual grooves 325 and an outer annular recess 326. The outer edge of the dial is formed with pockets wider than the grooves 325 as by means of the bits 327. A number of grooves 325 preferably equal to one-half of the cylinder needles is employed. The transfer implements mounted in the grooves in the dial bed are shown as comprising, as in the aforesaid patent, two flat bodies 328 and 329 having actuating butts 330. Each body terminates in a point 331 and has directly behind the point a notch 332. In the rear of the notch the bodies are bent away from each other as at 333. These implements are preferably made of thin, resilient sheet metal and may or may not be fastened together. The actuation of these transfer implements is controlled by suitable cams carried by the dial cap 334 having the hub 335 mounted in a depending sleeve portion 336 of the bracket hub 320 so that the dial cap is held relatively stationary with respect to the rotating dial.

The latch ring, as in my aforesaid Patent No. 1,695,734, is fitted with a gap-closing ring 337 fitting a recess in the latch ring 86 and rotarily mounted therein. This gap-closing ring is constructed and operated as in the aforesaid patent and accordingly as it is rotated in one direction or the other, one or the other of its pointed ends 338 acts to close the upper part of the gap formed in the yarn feeding throat 339 in the latch ring. The mechanism for thus operating the gap-closing ring comprises a bell crank lever 340 fulcrumed at 341 on the post 85. The vertical arm of this lever is connected by a link 342 to the gap-closing ring 337 and the horizontally projecting arm 343 is operated by the usual thrust bar, not shown, from the pattern drum 12. But when the needles such as 77 are operating as previously described in the formation of a selvage, it is necessary to provide additional means for operating the gap-closing ring so as to close the gap in the throat when these needles are raised and pass the gap so that their latches will remain open. For this purpose the gap-closing ring is removed from control of the pattern drum 12 and the ring is temporarily controlled by the drum 31. The lever 340 is provided with a projecting stud 344 and this stud rides in a right angle slot 345 in the end of a lever 346 pivoted at 347 on a follower lever 348. This follower lever is fulcrumed on the shaft 240 and at its lower end cooperates with the cam on the drum 31. A thrust bar 349 operated by cams on the pattern drum 12 acts at the proper time to lower the lever 346 so that the stud 344 rests in the vertical portion of the slot 345, thus placing the gap-closing ring under the control of the drum 31 to close and open the gap in the throat as the selvage is formed.

It is necessary that the appearance of the web be maintained throughout and therefore shall not change as the change takes place from round and round knitting at the upper part of the web to to and fro knitting which is carried on throughout the remainder of the web. In order to get the desired effect, it has been found necessary to vary the tension on the stitches and hence to provide mechanism for raising and lowering the tubular column 66. For this purpose the drum 31 is provided with suitable cams 350 and 351 which act on followers 352 and 353 carried on one arm of a forked end of a lever 355. This lever is fulcrumed on the shaft 356 carried in brackets from the stand 1. The forwardly extending end 357 of the lever 355 extends beneath an adjustable stop shown as a set screw 358 threaded in a projection 359 on the tubular column 66. While to and fro knitting is being performed toward the left, the cam 351 acts through the mechanism thus described to raise or lower the tubular column 66 thus to vary the tension of the stitch, and when the to and fro knitting is toward the right, the cam 351 is out of action and the cam 350 acts through the same mechanism to control the length of stitch. Both of the followers 352 and 353 are adjustably mounted on the arm 354 of the lever 355 so that they may be independently adjusted as required.

The yarns for forming the web are shown as presented by yarn guiding fingers of the usual type, except as hereinafter noted, and are moved into position to present the yarns required in the different stages of the knitting of the web. The number of these yarn guiding fingers will be determined according to the character of the work being performed. In illustrating a preferred form of the invention, five sets of fingers are shown. The yarn finger 360 carries a yarn suitable for knitting the leg, ankle, and foot sections. The yarn finger 361 carries the yarn for knitting the garter top. The yarn finger 362 carries the yarn employed in knitting the heel and toe sections where a heavier reinforced web is desirable. The yarn fingers 363 and 364 carry yarns suitable for reinforcing the web, as where the high spliced heel effect is desired and at the bottom of the foot. The yarn guides 360, 361, and 362 are shown as of the usual type pivotally mounted at 365 in an upstanding projection 366 of the latch ring 86 and are actuated by thrust bars 367 moved into and held in the required vertical positions by lugs or cams on the pattern drum 12.

The yarn fingers 363 and 364 which carry the splicing yarn for splicing the lower ankle section and the foot section at each side of the gap to form the high spliced heel effect and to reinforce the bottom of the foot are of novel construction and controlled in a novel manner. In the form illustrated, these fingers are pivoted respectively at 368 and 369 to levers 370 and 371 fulcrumed at 372 on the projection 366. The levers 370 and 371 carrying the fingers 363 and 364 and forming therewith the yarn guiding elements for the splicing yarns are normally elevated and are dropped into yarn feeding position by suitable thrust bars 373 controlled in the usual manner from the pattern drum 12. But when these yarn guides are thus in operative position, they pass under the control of cams on the drum 31 by means of which they throw the yarns in and out as required by the pattern of the spliced area. For this purpose the levers 370 and 371 are connected by links 374 respectively to levers 375 and 376 fulcrumed on the shaft 240 and provided at their lower ends with followers engaging suitable cams on the drum 31. In order that the needles which are to receive the splicing or reenforcing yarn may receive it before they are drawn down too far, it is necessary to swing the yarn finger 363 or 364 delivering the yarn toward the center of the throat and this is the reason for the pivotal mounting at 368 and 369. Normally these fingers stand in vertical position, as shown in full lines in Fig. 17, a spring 377 extending from an outwardly projecting stud 378 on the upper portion of the finger 363 and connected to the upstanding portion of the lever 370 acting to hold the finger against a lug or washer 379. A similar spring connected to the stud 380 holds the finger 364 against the lug or washer 381 on the upstanding portion of the lever 371. The yarn fingers 363 and 364 are swung on their pivots against the action of the springs 377 as required by a cam lever 382 fulcrumed at 383 on a post 384 extending upward from the projection 366 of the latch ring. This lever at its inner end has adjustably secured thereto by the set screws 385 wedge cams 386 and 387 acting when the lever is swung downward to cam whichever yarn finger 363 or 364 is located in yarn presenting position and bring it into central position at the throat. This lever is held normally elevated by a spring 388 connecting its rear end 389 to the same bracket 390 on the projection 366 to which are connected some of the usual springs 391 for depressing the yarn guiding fingers. This lever 382 is swung downward at the required time by a pin 392 projecting laterally from the upper end of a lever 393 fulcrumed on the shaft 240 and operated by the cam drum 31. Normally the pin 392 stands to the left of the lever 382 and thus not in position to engage it. But at the required time the pattern drum 12 acts on the thrust bar 394 which is connected to and rocks a bell crank lever 395 fulcrumed on a bracket 396 extending from the bracket 214 on the bed plate. The vertical arms of this bell crank lever is connected by a link 397 to the hub of the lever 393 so that when the thrust bar is raised, the lever 393 is shifted on the shaft 240 against the action of the spring 398 to carry the pin 392 beneath the wedge or cam lever 382.

The yarn guide 362 illustrated for carrying the yarn employed for knitting heavier sections of web, such as the heel and toe pockets, is off center at the throat plate and consequently when moving in one direction in the to and fro knitting the needles first brought to yarn receiving position are likely to receive the yarn beneath the latches which would result in the yarn being cast off and no stitches being formed when the needles were brought down by the stitch cam. To prevent this happening, the invention provides means for forcing the yarn extending from this yarn guiding finger over to one side of the throat plate or into a position where, when the needles reach the yarn, the stitch cam will have acted to bring them down sufficiently so that the yarn will be received above the latch and taken by the needle in the usual manner. For this purpose a yarn guiding pin 399 is employed and moved transversely of the throat as required to shift the yarn into the proper position. This pin 399 is carried by a plate 400 pivoted at 401 on a bar 402 secured to the rearwardly projecting hinged portion of the latch ring 86. This plate is guided and supported in its movement about the pivot 401 by a screw 403 secured in the latch ring and passing through an arcuate slot in the plate. The pin 399 projects up through an opening 404 in a plate 405 adjustably secured by set screws 406 to the latch ring and forming the bottom of the throat. The plate 400 is swung toward the right by the spring 407 connecting it to a rod 408 extending laterally from the latch ring and is moved in the opposite direction and thus controlled as to all its movements as required by suitable cams on the pattern drum 12 and by a cam 409 on the gear 15 which drives the shaft 14. For this purpose a lever 410 is fulcrumed at 411 on a projection 500 which is pivoted at 501 in the side frame 3. This lever is connected by a link 412 to the plate 400. The lever 410 at its opposite end is connected by a link 413 to an arm 414 extending rearwardly from and secured to the shaft 415 and a follower 416 secured to this shaft extends upwardly and cooperates with the cams on the pattern drum 12. Consequently at the required time the follower 416 under the control of the pattern drum rocks the shaft 415 and through the connections described swings the rearward end of the lever 410 downward on the pivot 501 into the path of the cam 409 which, at the required times, acts to rock the lever 410 about the pivot 411 in opposition to the spring 407 and thus to position the yarn guiding pin.

Suitable means are provided for severing and holding the yarns when withdrawn from the needles and for that purpose a construction is indicated such as shown in the patent to Scott, No. 1,282,958, above referred to, and including a guide and clamp 417 spring actuated about a pivot 418 mounted from the hub 335 of the dial cap 334. But as the construction and operation of such a severing and holding means are well known and familiar and disclosed in the said patent, no further description thereof is here necessary.

Figure 4:
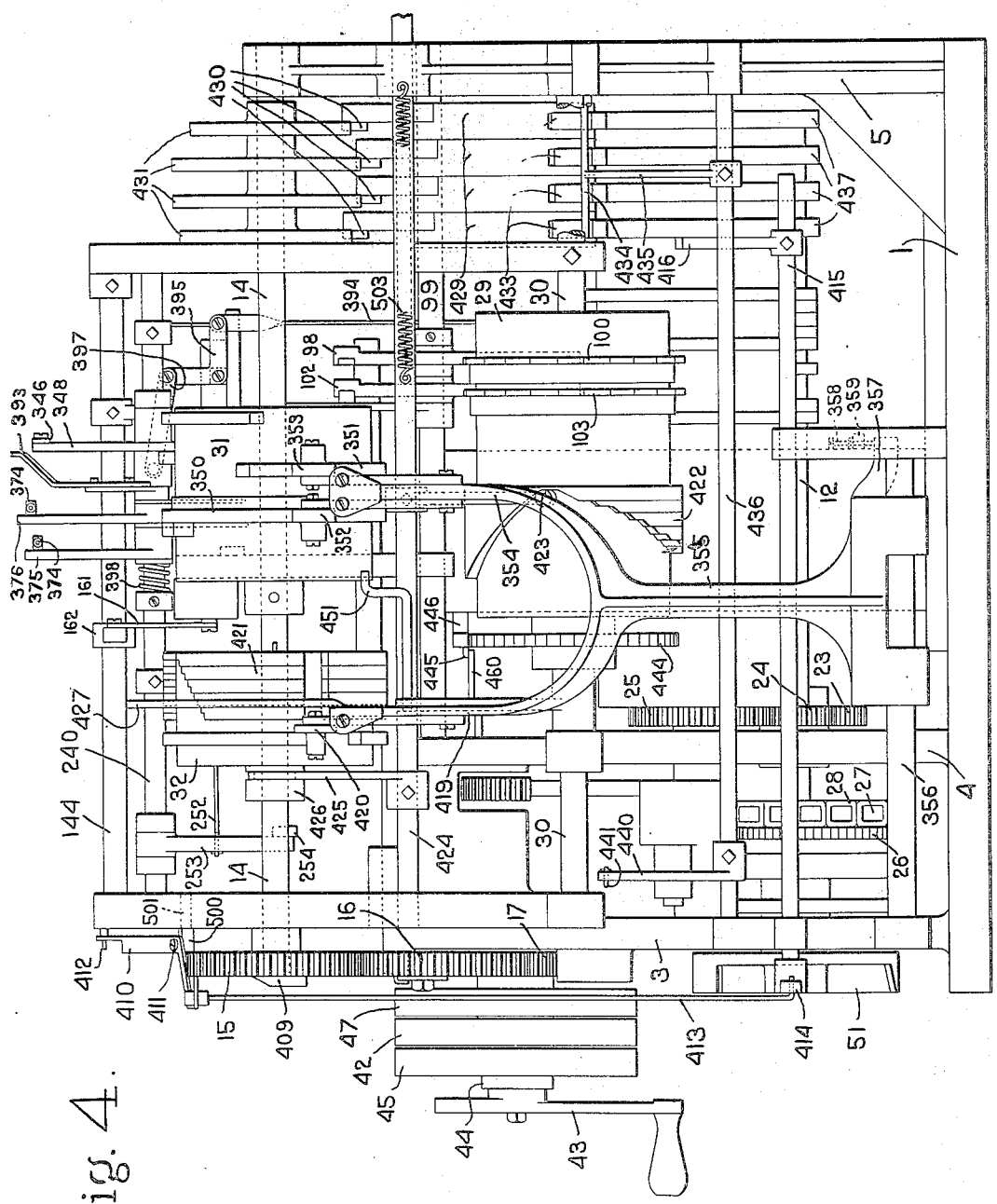
Fig. 4 is a view in rear elevation.

During the periods when reinforcing or splicing yarn is being fed to the needles, as in the formation of the high spliced heel and the spliced areas at the bottom of the foot section of the web, it is necessary further to control the tension on the yarn by shifting the vertical position of the tubular column 66. For this purpose the forked lever 355 has its arm 419 opposite the arm 354 provided with a follower 420 controlled from cams 421 on the sliding drum 32. During the normal operation, when splicing or reinforcing is not taking place, the follower 420 is out of engagement with the cams 421, but when splicing or reinforcing is to take place, the drum 32 is shifted into position to cause the cams to cooperate with the follower 420 and is then further shifted to vary the tension as required during reenforcing by connections operated from the drum 29. For this purpose the drum 29 is provided with the step cam 422 which acts on a follower 423 secured to a sliding rod 424 mounted in the frame. This rod has secured to it an arm 425 engaging a groove formed in a hub 426 of the sliding drum. The drum 29 is rotated at the proper time and cams the follower 423 to the left, viewing Fig. 4, and thus moves the sliding drum 32 with its operating cams 421 step by step into engagement with the follower 420, thus carrying the forked lever 355 and shifting the tubular column 66 to vary the tension as required. The shape of the cams which thus give the step by step movement may be varied in accordance with the shape of the reinforced or spliced area. A spring 503 connecting the sliding rod 424 to the side frame 5 holds the follower 423 up against the cam 422. The forked lever 355 is held up against the operating cams by a projection 427 extending upward therefrom and connected by a spring 428 to the frame.

The pattern drum 12, as already pointed out, is driven as required by either of two separate mechanisms. At one time it is driven from the shaft 19 by the interposed train of gears 23, 24, and 25. At other times it is driven from the shaft 14 which, it will be remembered, is driven from the main shaft by the interposed gears 15, 16, and 17. For this purpose a plurality of pawl carrying levers 429, herein shown as four in number, are fulcrumed on the shaft 99 and carry at their upper ends follower rolls 430 engaging cams 431 on the shaft 14. These pawl carriers 429 at their lower ends have pivoted thereto the forwardly extending pawls 432 provided with rearward extensions 433. A bar 434 carried by an arm 435 secured to the shaft 436 extending transversely of the frame normally rests on top of these pawl extensions 433, thus holding the pawls elevated. The pawls, when in action, cooperate with the toothed wheels 437 on the pattern drum 12 according to the shape of the cams 431 and are yieldingly held in engagement with the toothed wheels by springs 438 connecting the rear end of the extensions 433 to the frame. The arm 435 of the shaft 436 is swung yieldingly against the rearward extension of the pawls by the spring 439 connecting the end of the arm 435 forwardly to the frame. An arm 440 secured to the shaft 436 at the opposite end is connected by a link 441 to an arm 442 connected with the pawl controller 443. This pawl controller operates as fully described in the aforesaid Patent No. 1,695,734, under the control of the pattern chain 28, to control the engagement of the pawl 21 with the rack wheel 20. Consequently the movement imparted to the pawl controlled by the pattern chain is transmitted through the link 441 and the connections described to control the engagement of the pawls 432 with the ratchet wheels 437 on the pattern drum 12. The teeth on the ratchet wheels 437 are so arranged that only one pawl is driving at the same time and the arrangement is such that these pawls 432 actuated by the cams 431 drive the pattern drum 12 at one time, while the usual pawl 21 acting on the rack wheel 20 drives the pattern drum 12 through the medium of the shaft 19 and the gears 23, 24, and 25 at another time, all as required by the work to be performed.

As already pointed out, the drum 29 with its shaft 30 is driven from the main shaft 8 under the control of both the pattern chain 28 and the drum 31. A suitable mechanism for thus operating the drum 29 is shown in Figs. 19 and 20. The shaft 30 on which the drum 29 is mounted is provided with the ratchet wheel 444 and this ratchet wheel is operated, and with it the drum 29, intermittently by a pawl 445 on a pawl carrier 446 pivoted at its forward end to a lever 447 fulcrumed on the shaft 39 and carrying at its upper end a roll 448 engaging an eccentric 449 carried on the end of the main shaft 8, see Figs. 26 and 28. Thus as the main shaft is operated, the shaft 30 is intermittently rotated provided the pawl 445 is in engagement with the ratchet wheel 444. Two means are provided, the action of both of which must concur, in order to permit engagement of the pawl with the ratchet wheel and either of which may prevent such engagement. As one means, a cam 450 is provided on the drum 31 or secured to the shaft 14 to rotate therewith. This cam acts upon one arm 451 of a bell crank lever journalled on the shaft 30 and having its other arm 452 extending beneath the pawl carrier 446. When the low part of the cam 450 is in engagement with the arm 451, the pawl 445 may, if not otherwse controlled, drop into engagement with the ratchet wheel 444. As the other means, a second pawl controlling lever 453 is journalled on the shaft 39. One arm 454 of this lever has adjustably mounted therein a pin 455 overlying the pattern chain 28 on the sprocket wheel 27, while another arm 456 has adjustably connected thereto a rod 457 extending back and connected to one arm 458 of a bell crank lever fulcrumed on a vertical stud 459 carried from the frame. The other arm 460 of this lever is normally drawn by a spring 461 against the face of the ratchet wheel 444 and beneath the pawl 445, camming it upward and holding it out of engagement with the ratchet wheel. When a lug on the pattern chain 28 passes beneath the pin 455, the arm 460 of the lever is withdrawn from beneath the pawl 445, allowing it to drop into engagement with the ratchet wheel 444 provided the cam 450 permits.

As already pointed out, one object of the mechanism embodying this invention is to produce a stocking web and to carry out the methods disclosed in my aforesaid application No. 372,017, in which the ankle, heel pocket, foot and toe pocket sections are all knitted by to and fro knitting, leaving a gap at the back of the web to be subsequently seamed together and with the toe pocket section formed at the front of the web. The heel pocket section is knit with the yarn at each reciprocation floating across this gap, the floating yarn to be cut away when the web is seamed up. The edges of the gap at the back of the web where no yarn floats are selvaged as by the operation of the needles 77 already described. Reinforcing or splicing yarns are preferably introduced in accordance with the method disclosed in my aforesaid application No. 372,017 to form spliced areas at each side of the gap in the lower ankle portion and again at each side of the gap in the foot portion. The inner edges of these spliced areas in the ankle portion may be coincident with the edges of the gap to form a solid spliced area when the web is seamed up, or the inner edges of the spliced areas may be located in the body of the web and away from the edges of the gap, thus forming separate spliced areas at each side of the center of the back of the web in the ankle portion. The edges of such spliced areas adjacent the gap and the inner edges of these spliced areas in the body of the web, as well as the inner edges of the spliced areas of the foot section in the body of the web, may have any desired configuration and these areas may be of any desired and varying width, all as determined by the pattern jacks controlling the needles which allow a very high degree of flexibility in these particulars. Furthermore, the machine enables the lateral edges of the spliced areas lying within the body of the web to be formed without the usual cut ends or fringes. This result is secured because each spliced area is knit by to and fro knitting and with the splicing yarn extending continuously back and forth between the two edges of each area.

Any unsightly appearance at the edges of the spliced areas due to the introduction of the splicing yarn is prevented by operating the needles, under the control of the pattern jacks, adjacent the edges of the spliced areas to cause the splicing yarn to float laterally at each edge from alternate to intermediate courses. Where the edges of the spliced areas coincide with the edges of the gap in the web, the splicing yarn is preferably knit along with the body yarn as already described. Where the edges of the spliced areas are within the body of the web, the pattern jacks act to prevent one or more adjacent needles at the edge of the spliced area from taking the splicing yarn upon the reciprocation in one direction with respect to the edge, thus causing the splicing yarn to float laterally at the edge from alternate to intermediate courses. Preferably these adjacent needles at the edge of the spliced area are prevented from taking the splicing yarn upon the reciprocation toward the center of the splicing area while they take the splicing yarn in the usual way upon reciprocation in the opposite direction. This result is preferably accomplished by slightly raising the required needles in conjunction with the proper manipulation of the yarn guides so as to prevent these needles from receiving the splicing yarn.

It will, of course, be understood that the machine will be equipped with the usual adjunctive devices, such as yarn take-ups and the like, required in knitting, that many of the parts, the general construction and operation of which are familiar to those skilled in the art, have not been described in detail and in some cases have been omitted for clearness of illustration, that the number of yarn guides and reinforcing yarns may be varied as desired, and other changes and adjustments made.

Having thus described the invention, what is claimed as new, and desired to be secured by Letters Patent, is:

1. A knitting machine comprising a circular series of needles including a group of long butt needles, two groups of medium butt needles one at each side of the long butt needles and a group of short butt needles diametrically opposite the group of long butt needles, and means for operating the needles to produce web sections including a section of round and round knitting formed on both the short and medium butt needles, a section of to and fro knitting formed on the short and medium butt needles, a section of to and fro knitting formed on the medium butt needles, a section of to and fro knitting formed on the short and medium butt needles, a section of to and fro knitting formed on the short butt needles, and means for preventing the long butt needles from taking yarn during the knitting of the said sections.

2. A knitting machine comprising a needle cylinder, a circular series of needles mounted to reciprocate therein, a cam cylinder for controlling the needles, means for relatively oscillating the needle cylinder and cam cylinder for predetermined periods to knit in succession a section of to and fro work to form the angle section of a stocking web, a section of to and fro work to form the heel section, a section of to and fro work to form the foot section, and a section of to and fro work to form the toe section, and means for automatically shifting the relative rotary positions of the needle cylinder and cam cylinder 180° at the beginning and at the end of the knitting of the heel section to cause the heel section to be knit on the opposite side of the web from the ankle, foot and toe sections.

3. A knitting machine comprising the construction defined in claim 2, together with means for maintaining a segment of the needles at the back of the web out of action and without retaining yarn during the knitting of the said sections to form a gap throughout the length thereof with the yarn floating across the gap throughout the heel section.

4. A knitting machine comprising the construction defined in claim 2, together with means for maintaining a segment of needles out of action and without retaining yarn during the knitting of the said sections to form a gap throughout the length thereof, and means for preventing each edge needle employed in the to and fro knitting of the said ankle and foot sections from taking the yarn on the reciprocation away from the edge and causing each of these needles to knit only on the reciprocation toward the edge.

5. A knitting machine comprising a needle cylinder, a circular series of needles mounted to reciprocate therein, a cam cylinder for controlling the needles, means for relatively rotating and for relatively oscillating the needle cylinder and cam cylinder for predetermined periods to knit in succession a section of round and round work to form the leg and calf sections of a stocking web, a section of to and fro work to form the ankle section, a section of to and fro work to form the heel section, a section of to and fro work to form the foot section, a section of to and fro work to form the toe section, and means for automatically shifting the relative rotary positions of the needle cylinder and of the cam cylinder 180° at the beginning and at the end of the knitting of the heel section to cause the heel section to be knit on the opposite side of the web from the angle, foot and toe sections.

6. A knitting machine comprising the construction defined in claim 5, together with means for maintaining a segment of the needles at the back of the web out of action and without retaining yarn during the knitting of to and fro work.

7. A knitting machine comprising the construction defined in claim 5, together with means for maintaining a segment of the needles at the back of the web out of action and without retaining yarn during the last few rounds of the knitting of the said section of round and round work and during the knitting of to and fro work thereby to form a gap throughout the length of the web knitted by to and fro work non-raveling at the top.

8. A knitting machine comprising a circular series of needles, means for maintaining a segment of the needles out of action during the knitting of consecutive sections of to and fro work to form the ankle, heel, foot and toe portions, respectively, of a stocking web with an unknit strip extending midway at the back longitudinally thereof, and means for operating the remaining needles to knit in succession the aforesaid consecutive sections of work with those needles holding the stitches during the narrowing and widening in the knitting of the heel section standing on the opposite side of the series from those holding the stitches during the narrowing and widening in the knitting of the toe section.

9. A knitting machine comprising a circular series of needles including the following segments, A B C D arranged in circular sequence with the segments A and C diametrically disposed and with the segments BB symmetrically disposed with respect to the said diameter, and means for maintaining the needles of segment C out of action and, first, operating the needles of segments A and B to form round and round work with the yarn floating in each course past segment C, and, second, operating the needles of segments A and B to form to and fro work and, third, operating the needles of segments B to form sections of to and fro work narrowing and widening with the yarn floating in each course past segment C and, fourth, again operating the needles of segments A and B to form to and fro work and, fifth, operating the needles of segment A narrowing and widening to form to and fro work.

10. A knitting machine comprising a circular series of needles including a segment for knitting a section of to and fro work and two segments, one at each side of the first segment, for knitting with the first segment a section of to and fro knitting and for knitting together alone a section of to and fro knitting, and means for operating the needles to knit at one period to and fro knitting on the first segment, at another period to and fro knitting on the three segments together, and at another period to and fro knitting jointly on the two side segments.

11. A knitting machine for knitting a stocking web comprising a needle cylinder, a circular series of needles mounted to reciprocate therein, a cam cylinder for controlling the needles, and means for operating the needles and for, first relatively rotating and, second, relatively oscillating the needle cylinder and cam cylinder to knit in succession a section of round and round work for the leg, a section of to and fro work for the ankle, a section of to and fro narrowing and widening work to form the heel pocket, a section of to and fro work for the foot, and a section of to and fro narrowing and widening work to form the toe pocket, and means for automatically shifting the relative rotary positions of the needle cylinder and of the cam cylinder 180° at the beginning and at the end of the knitting of the heel pocket section.

12. A knitting machine for knitting a stocking web comprising the construction defined in claim 11, together with means for throwing out of action and casting off the yarn from a segment of needles prior to beginning the knitting of the section of to and fro work for the ankle.

13. A knitting machine for knitting a stocking web comprising the construction defined in claim 11, together with means for throwing out of action and casting off the yarn from a segment of needles prior to beginning the knitting of the section of to and fro work for the ankle, and means for feeding splicing yarn to the needles adjacent the segment of needles out of action during the knitting of the ankle section to form selvaged splicing areas at the back of the web.

14. A knitting machine for knitting a stocking web comprising the construction defined in claim 11, together with means for throwing out of action and casting off the yarn from a segment of needles prior to beginning the knitting of the section of to and fro work for the ankle, and means for feeding splicing yarn to the needles adjacent the segment of needles out of action during the knitting of the foot section to form selvaged splicing areas at the back of the web.

15. A knitting machine for knitting a stocking web comprising the construction defined in claim 11, together with means for throwing out of action and casting off the yarn from a segment of needles prior to beginning the knitting of the section of to and fro work for the ankle, and means for restoring into action the aforesaid segment of needles before beginning the knitting of the section of round and round work for the leg of the succeeding stocking web.

16. A knitting machine comprising a needle cylinder, a series of needles forming a circular segment mounted to reciprocate in the cylinder, a cam cylinder for controlling the needles, means for relatively oscillating the needle cylinder and cam cylinder, means for feeding a main yarn to the needles during said relative oscillation, means for feeding splicing yarns to the end portions of said segment of needles to form a splicing area adjacent each edge of the web, and means for operating the needles to knit to and fro work on said segment including means to prevent the last needle, which takes the splicing yarn at one edge of the spliced area on the reciprocations toward said edge, from taking the splicing yarn on the reciprocations away from said edge and to prevent a plurality of adjacent needles, which last take the splicing yarn at the other edge of the area on the reciprocations toward said other edge, from taking the splicing yarn on the reciprocations away from said other edge.

17. A knitting machine comprising a needle cylinder, a series of needles forming a circular segment mounted to reciprocate in the cylinder, a cam cylinder for controlling the needles, means for relatively oscillating the needle cylinder and cam cylinder, means for feeding a main yarn to the needles during said relative oscillation, means for feeding splicing yarns to the end portions of said segment of needles to form a splicing area adjacent each edge of the web, and means for operating the needles to knit to and fro work on said segment including means to prevent each edge needle of said segment from taking the main and splicing yarns on the reciprocations away from its edge, to cause the said needle to knit the main and splicing yarns only on the reciprocations toward its edge, and to prevent a plurality of adjacent needles, which last take the splicing yarn at the other edge of the spliced area on the reciprocations toward said other edge, from taking the splicing yarn on the reciprocations away from said other edge whereby the spliced area at each side and the web present a common selvage and the spliced area presents a selvage in the body of the web.

18. A knitting machine comprising a needle cylinder, a series of needles forming a circular segment mounted to reciprocate in the cylinder, a cam cylinder for controlling the needles, means for relatively oscillating the needle cylinder and cam cylinder, means for feeding a main yarn to the needles during said relative oscillation, means for feeding splicing yarns to the end portions of said segment of needles to form a splicing area adjacent each edge of the web, and means for operating the needles to knit to and fro work on said segment including means to prevent a plurality of adjacent needles at one edge of each spliced area from taking the splicing yarn upon the reciprocations in one direction thus to cause the splicing yarn to float laterally at the said edge of the said area from alternate to intermediate courses.

19. A knitting machine comprising a needle cylinder, a series of needles forming a circular segment mounted to reciprocate in the cylinder, a cam cylinder for controlling the needles, means for relatively oscillating the needle cylinder and cam cylinder, means for feeding a main yarn to the needles during said relative oscillation, means for feeding splicing yarns to the end portions of said segment of needles to form a splicing area adjacent each edge of the web, and means for operating the needles to knit to and fro work on said segment including means to prevent a plurality of adjacent needles at each edge of each spliced area from taking the splicing yarn upon the reciprocations in one direction with respect to the particular edge thus to cause the splicing yarn to float laterally at each edge of each spliced area from alternate to intermediate courses.

20. A knitting machine comprising a needle cylinder, a series of needles forming a circular segment mounted to reciprocate in the cylinder, a cam cylinder for controlling the needles, means for relatively oscillating the needle cylinder and cam cylinder, means for feeding a main yarn to the needles during said relative oscillation, means for feeding splicing yarns to the end portions of said segment of needles to form a splicing area adjacent each edge of the web, and means for operating the needles to knit to and fro work on said segment including means to prevent a plurality of adjacent needles at each edge of one of the said spliced areas from taking the splicing yarn upon the reciprocations toward the center of the said spliced area thus to cause the splicing yarn to float laterally at each edge of the said spliced area from alternate to intermediate courses.

21. A knitting machine comprising a needle cylinder, a circular series of needles mounted to reciprocate therein, a cam cylinder including a radially movable two-part stitch cam for controlling the needles, means for relatively rotating and for relatively oscillating the needle cylinder and cam cylinder to produce round and round work and to and fro work as desired, and pattern controlled means for holding one part of the stitch cam out of action and the other part in action during round and round knitting and for alternately moving radially each part of the stitch cam in and out during to and fro knitting.

22. A knitting machine comprising a needle cylinder, a circular series of needles mounted to reciprocate therein, a cam cylinder including a two-part stitch cam for controlling the needles, means for relatively rotating and for relatively oscillating the needle cylinder and cam cylinder to produce round and round work and to and fro work as desired, two independently actuated drums, the first drum acting to hold one stitch cam part in action and the other part out of action during round and round knitting and the other drum acting alternately to move each part of the stitch cam in and out during to and fro knitting.

23. A knitting machine comprising a needle cylinder, a circular series of needles mounted to reciprocate therein, a cam cylinder including a two-part stitch cam for controlling the needles, means for relatively rotating and for relatively oscillating the needle cylinder and cam cylinder to produce round and round work and to and fro work as desired, two independently actuated drums, the first drum acting to hold one stitch cam part in action and the other part out of action during round and round knitting and the other drum acting alternately to move each part of the stitch cam in and out during to and fro knitting, and the first drum acting to determine the period of control of the two stitch cam parts by the other drum.

24. A knitting machine comprising the construction defined in claim 21, together with an elevating cam and means for throwing it into action and maintaining it in action during round and round knitting to raise the needles before they reach the first stitch cam part in action.

25. A knitting machine comprising a needle cylinder, a circular segment of needles mounted to reciprocate therein, a cam cylinder for controlling the needles, means for oscillating the needle cylinder to knit to and fro work, a pair of splicing yarn guiding fingers normally held in non-feeding position and alternately moved into and held in feeding position during the passage back and forth therepast of a group of needles near each end of the segment to form spliced areas adjacent the edges of the gap in the web.

26. A knitting machine comprising the construction defined in claim 25 in which the yarn guiding portion of each finger is mounted to swing transversely of the needle cylinder and means for swinging the said portion of each finger when brought into yarn feeding position to insure the needles taking the yarn therefrom.

27. A knitting machine comprising a needle cylinder, a circular segment of needles mounted to reciprocate therein, a cam cylinder for controlling the needles, means for oscillating the needle cylinder to knit to and fro work, a yarn guiding throat associated with the cam cylinder, a pair of splicing yarn guiding fingers normally held elevated above the throat and alternately movable into feeding position in the throat, each yarn guiding finger having its yarn guiding portion pivotally mounted to swing toward the throat center and means for swinging said portion toward the throat center when the yarn guiding finger is in feeding position to insure the needles taking the yarn carried thereby.

28. A knitting machine comprising the construction defined in claim 27 having two independently actuated pattern drums, the first of which acts to hold the said yarn guiding fingers in non-feeding position and to allow them to assume feeding position when required and the second of which acts to move the said fingers alternately into and out of feeding position.

29. A knitting machine comprising a needle cylinder, a circular segment of needles mounted to reciprocate therein, a cam cylinder for controlling the needles, means for oscillating the needle cylinder to knit to and fro work, a yarn guiding throat associated with the cam cylinder, a yarn guiding finger mounted off center of the throat, means for moving the said finger as required into feeding position, and means for forcing the yarn carried by the finger when in feeding position laterally into a position in the throat where it will be received by the needles.

30. A knitting machine comprising a needle cylinder, a circular segment of needles mounted to reciprocate therein, a cam cylinder for controlling the needles, means for oscillating the needle cylinder to knit to and fro work, a yarn guiding throat associated with the cam cylinder, a yarn guiding finger mounted off center of the throat, means for moving the said finger as required into feeding position, a yarn guiding pin and means for moving it transversely of the throat to force the yarn presented by said finger into position to be received by the needles.

31. In a knitting machine a pattern drum for controlling various operations of the machine a cam shaft geared to the pattern drum, a ratchet wheel on the cam shaft, a pawl for driving the ratchet wheel and means for operating the same, a continuously driven shaft, a plurality of ratchet wheels on the pattern drum, pawls for cooperating with the ratchet wheels, a plurality of cams on the driven shaft for operating the pawls, and a controlling connection between the first-mentioned pawl and the said plurality of pawls acting to permit as required the independent action of either the former or the latter to effect the rotation of the pattern drum.

32. In a knitting machine a cam drum for controlling various operations of the machine, a ratchet wheel connected therewith, a pawl and means for driving the pawl for operating the ratchet wheel, a pattern chain and means for driving it, a second cam drum and means for driving it independently of the first cam drum, and means controlled both by the pattern chain and by the second cam drum for controlling the co-action of the pawl and ratchet wheel to effect the operation of the first cam drum.

33. A knitting machine comprising a needle cylinder, a circular series of needles mounted to reciprocate therein, a cam cylinder for controlling the needles, means for maintaining a segment of needles out of action and without retaining yarn, means for operating the remaining needles and for producing relative oscillation of said needle and cam cylinders to knit a section of to and fro work, means for feeding a splicing yarn to a group of needles in action at each side of the segment out of action to form selvaged spliced areas at each side of the central gap left by the needles out of action, and means for varying, during the knitting of said spliced areas, the number of needles in action in the said groups which receive the splicing yarn thus to produce a predetermined configuration of the edges of the spliced areas.

34. A knitting machine comprising a needle cylinder, a circular series of needles mounted to reciprocate therein, a cam cylinder for controlling the needles, means for maintaining a segment of needles out of action and without retaining yarn, means for operating the remaining needles and for producing relative oscillation of said needle and cam cylinders to knit a section of to and fro work, means for feeding a splicing yarn to a group of needles in action at each side of the segment out of action to form selvaged spliced areas at each side of the central gap left by the needles out of action, and means acting to vary the length of stitch at the beginning and at the end of the knitting of said spliced areas.

35. A knitting machine comprising a needle cylinder, a circular series of needles mounted to reciprocate therein, a cam cylinder for controlling the needles, means for maintaining a segment of needles out of action and without retaining yarn, means for operating the remaining needles and for producing relative oscillation of said needle and cam cylinders to knit a section of to and fro work, means for feeding a splicing yarn to a group of needles in action at each side of the segment out of action to form selvaged spliced areas at each side of the central gap left by the needles out of action, means for varying, during the knitting of said spliced areas, the number of needles in action in the said groups which receive the splicing yarn thus to produce a predetermined configuration of the edges of the spliced areas, and means acting to vary the length of stitch at the beginning, during and at the end of the knitting of said spliced areas.

36. The method of forming a continuous stocking web with a circular series of needles which comprises the following steps in sequence, (1) knitting a section of round and round work for the leg, (2) throwing out of action and casting off from a segment of needles at the back of the web, (3) knitting courses of round and round work with the yarn floating past the needles of the said segment forming a holding section, (4) knitting a section of to and fro work to form an ankle section with separated selvaged edges at the back of the web, (5) feeding splicing yarn to the needles adjacent the separated selvaged edges of the web during the knitting of at least the lower portion of the ankle section, (6) knitting a section of to and fro narrowing and widening work at the back of the web to form the heel pocket with an unknitted gap at the back of the web where the segment of needles is out of action, (7) knitting a section of to and fro work to form a foot section with separated selvaged edges at the back of the web, (8) feeding splicing yarn to the needles adjacent the separated selvaged edges of the web during the knitting of the foot section, (9) knitting a section of to and fro narrowing and widening work at the front of the web to form the toe pocket section.

37. The method of forming a continuous stocking web with a circular series of needles which comprises the following steps in sequence, (1) knitting a section of round and round work for the leg, (2) throwing out of action and casting off from a segment of needles at the back of the web, (3) knitting courses of round and round work with the yarn floating past the needles of the said segment forming a holding section, and (4) knitting successive sections of to and fro work to form the remainder of the web with an unknitted gap at the back of the web where the segment of needles is out of action.

38. The method of forming a continuous stocking web with a circular series of needles which comprises the following steps in sequence, (1) knitting a section of round and round work for the leg, (2) throwing out of action and casting off from a segment of needles at the back of the web, (3) knitting courses of round and round work with the yarn floating past the needles of the said segment forming a holding section, (4) knitting a section of to and fro work to form an ankle section with separated selvaged edges at the back of the web, (5) knitting a section of to and fro narrowing and widening work at the back of the web to form the heel pocket with an unknitted gap at the back of the web where the segment of needles is out of action, (6) knitting a section of to and fro work to form a foot section with separated selvaged edges at the back of the web, (7) knitting a section of to and fro narrowing and widening work at the front of the web to form the toe pocket section.

In testimony whereof, I have signed my name to this specification.

PATRICK P. LA MONTAGNE.

CERTIFICATE OF CORRECTION.

Patent No. 1,893,589. January 10, 1933.

PATRICK P. LA MONTAGNE.

It is hereby certified that error appears in the printed specification of the above numbered patent requiring correction as follows: Page 1, line 51, for "splaced" read "spliced"; page 4, line 11, and page 15, lines 73 and 125, claims 2 and 5, respectively, for "angle" read "ankle"; page 6, line 123, for "enner" read "inner"; page 12, line 119, for "arms" read "arm", and page 16, line 32, claim 9, for the letter "D" read "B"; and that the said Letters Patent should be read with these corrections therein that the same may conform to the record .of the case in the Patent Office.

Signed and sealed this 28th day of February, A. D. 1933.

(Seal)

M. J. Moore,
Acting Commissioner of Patents.